United States Patent [19]
Negishi et al.

[11] Patent Number: 5,831,623
[45] Date of Patent: Nov. 3, 1998

[54] VOLUME RENDERING APPARATUS AND METHOD

[75] Inventors: Hiroyasu Negishi; Masatoshi Kameyama, both of Tokyo, Japan

[73] Assignee: Mitsubishi Denki Kabushiki Kaisha, Tokyo, Japan

[21] Appl. No.: 671,685

[22] Filed: Jun. 28, 1996

[30] Foreign Application Priority Data

Aug. 9, 1995 [JP] Japan ................................. 7-203191

[51] Int. Cl.$^6$ .................................................. G06T 11/40
[52] U.S. Cl. ........................... 345/424; 345/423; 345/430
[58] Field of Search ................................. 345/423, 430, 345/435, 425, 424

[56] References Cited

U.S. PATENT DOCUMENTS

| | | | |
|---|---|---|---|
| 4,984,157 | 1/1991 | Cline et al. | 345/424 |
| 5,307,450 | 4/1994 | Grossman | 345/423 |
| 5,454,371 | 10/1995 | Fenster et al. | 345/419 X |
| 5,570,460 | 10/1996 | Ramanujam | 345/424 |

OTHER PUBLICATIONS

Abstract of Japanese Unexamined Patent Application HEI 5–266216.

*Primary Examiner*—Mark K. Zimmerman
*Attorney, Agent, or Firm*—Wolf, Greenfield & Sacks, P.C.

[57] ABSTRACT

Volume rendering apparatus including a voxel memory, a parameter provider, an address generator, a mapping unit, an image memory and a blender. The voxel memory stores original volume data. A parameter provider calculates a parameter of a volume plane which slices the volume object orthogonally to a direction of view, calculates a parameter of a three-dimensional mapping plane which slices the mapping object according to a point of view coordinate system and converts the three-dimensional mapping plane to a two-dimensional mapping plane. An address generator generates voxel memory addresses and image memory addresses and a mapping unit maps the volume plane on each of the mapping planes. An image memory stores mapping data and rendering data and a blender performs blending of data in the image memory and data on each of the mapping planes and writes the blended data back in the image memory.

21 Claims, 27 Drawing Sheets

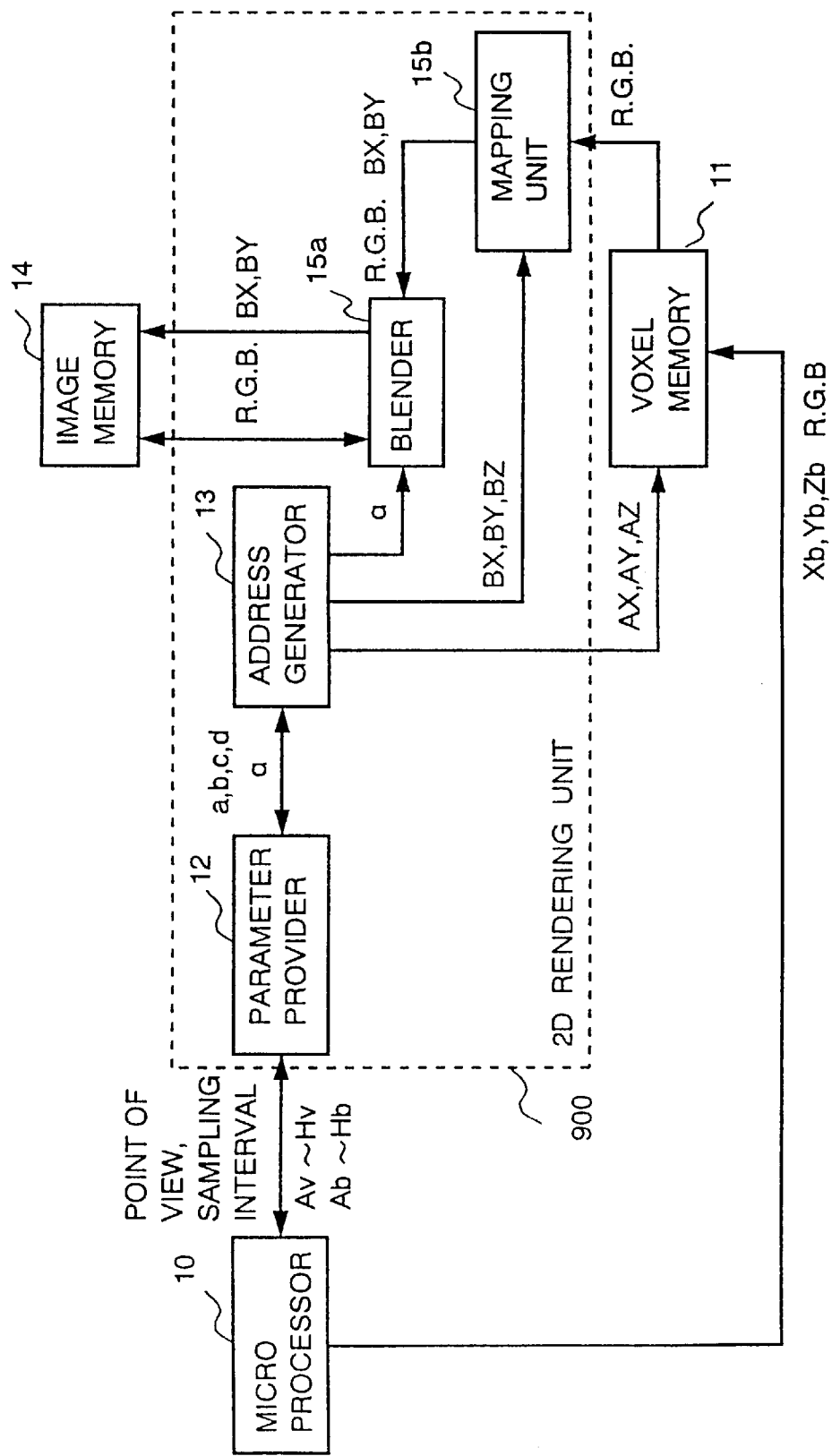

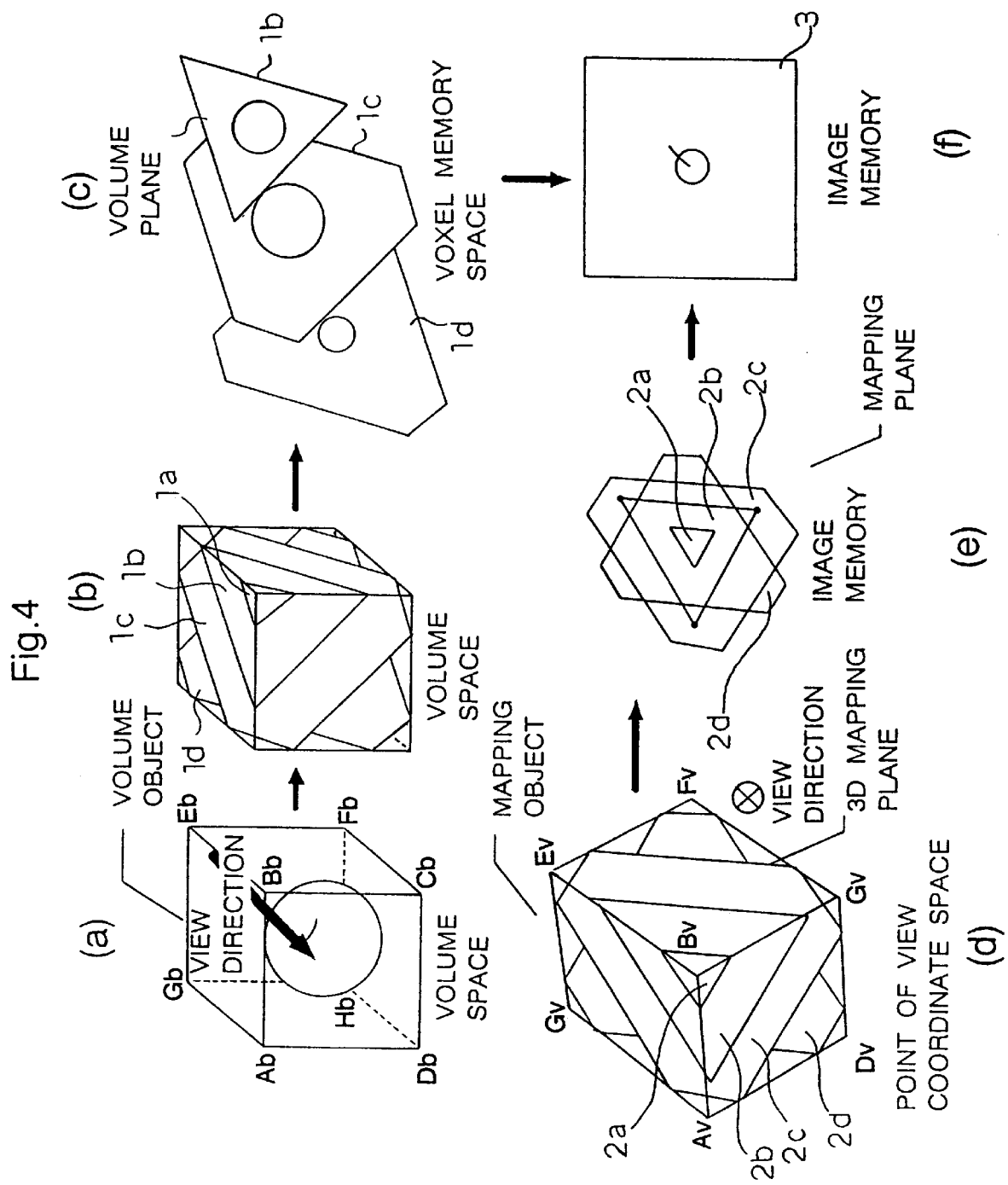

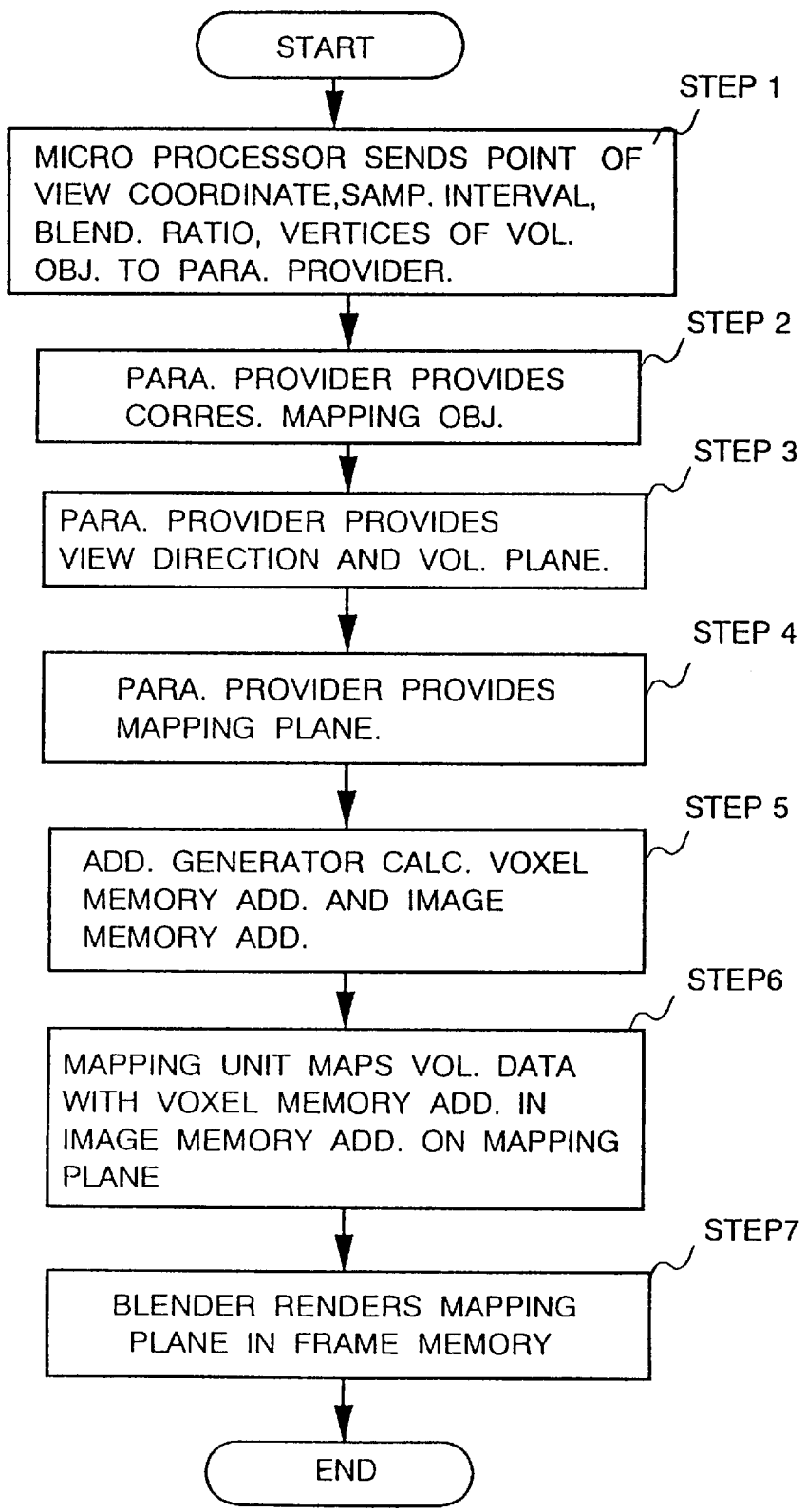

VOLUME PLANE

MAPPING PLANE

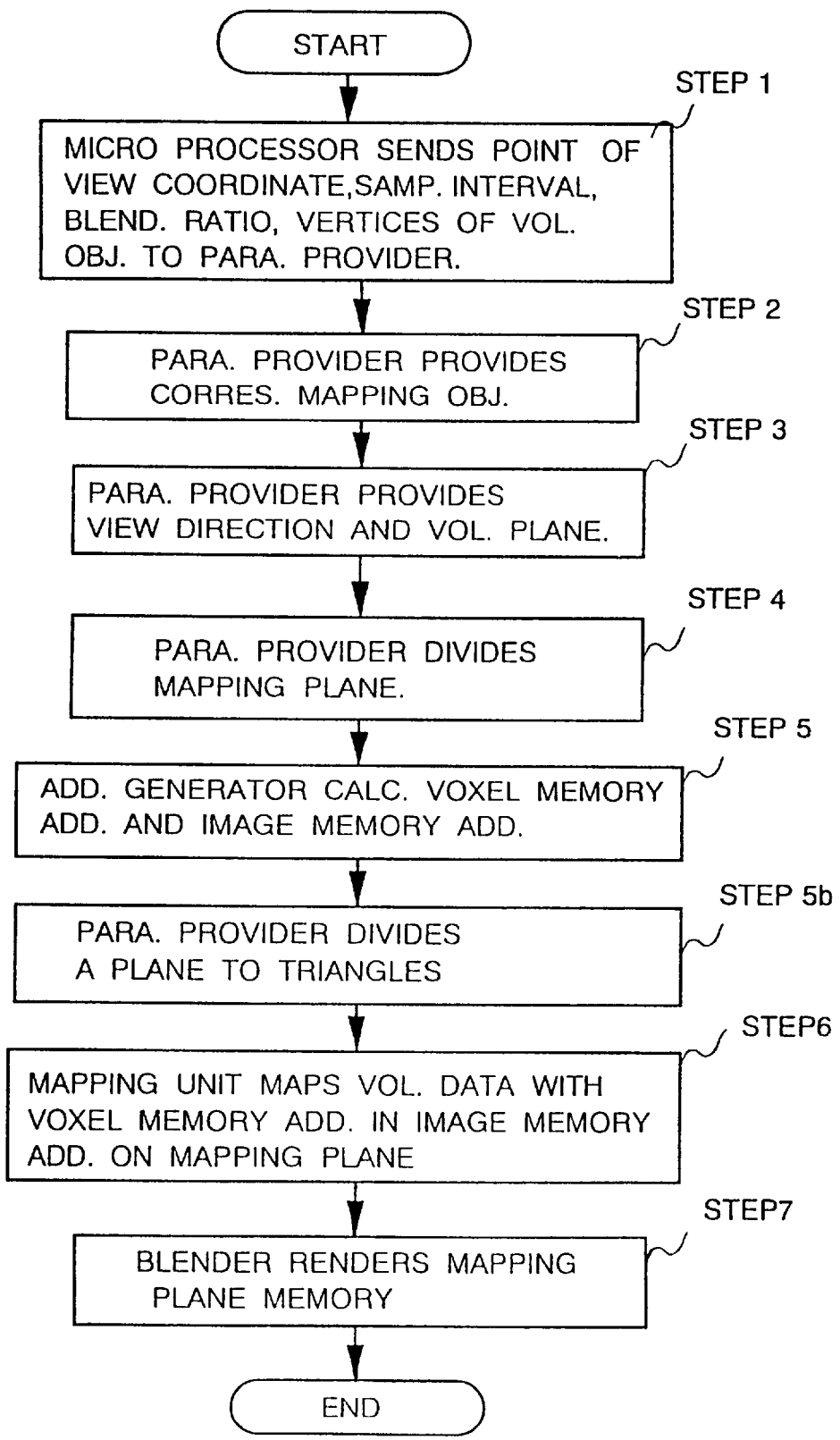

TRIANGLE ON VOLUME OBJECT

TRIANGLE ON MAPPING PLANE IN IMAGE MEMORY

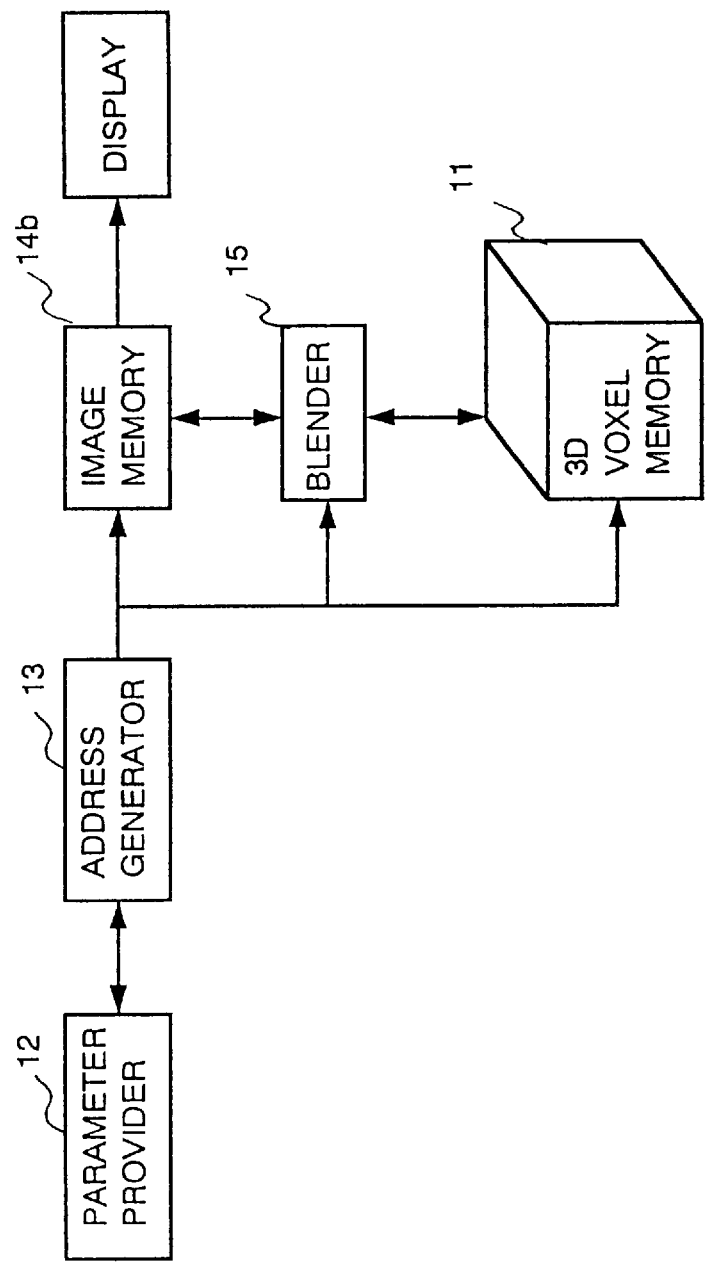

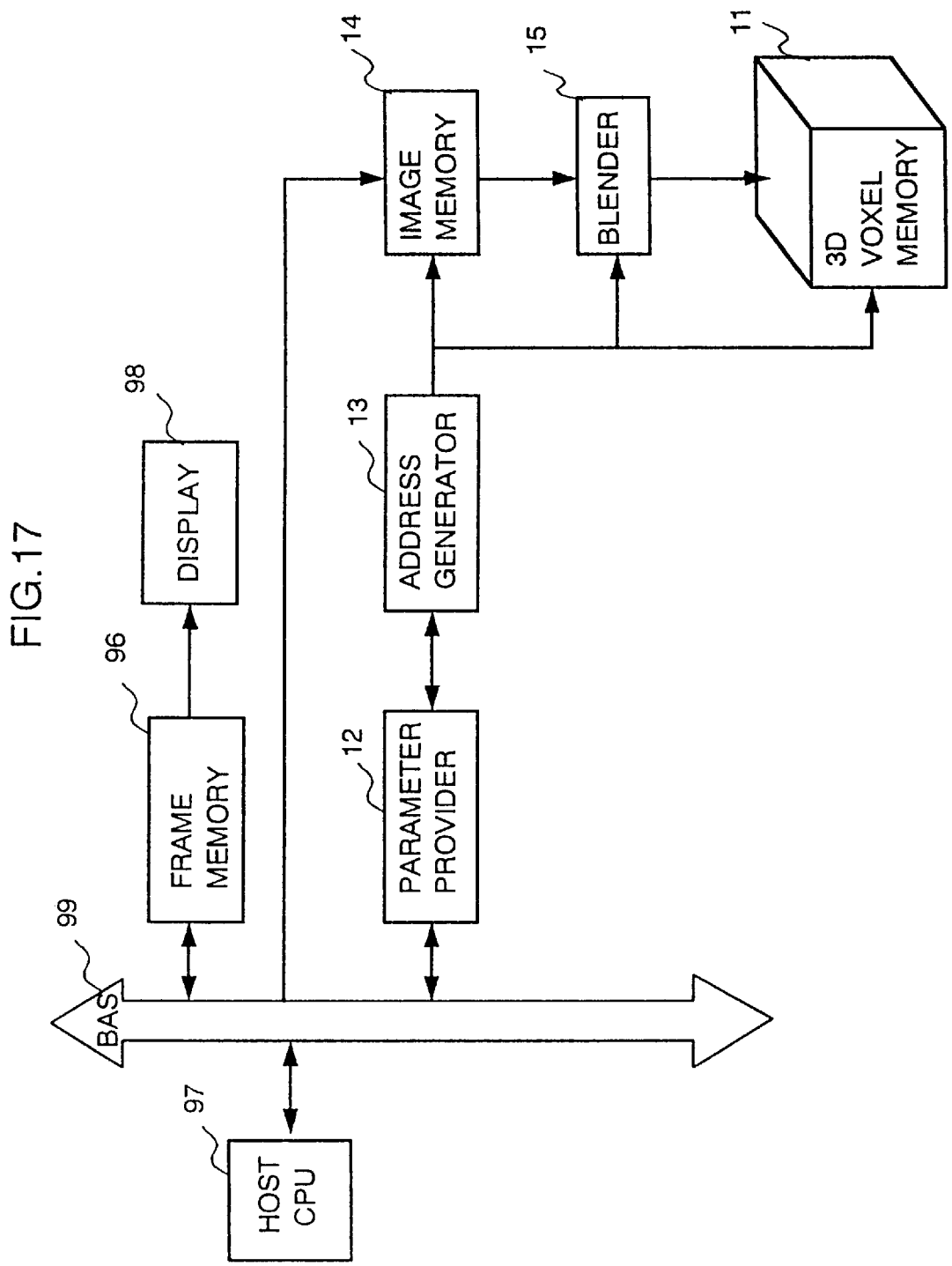

UP1 = P (XU,YU,ZU) * (X - XD) + P (XD,YU,ZU) * (XU - X)
UP2 = P (XU,YD,ZU) * (X - XD) + P (XD,YD,ZU) * (XU - X)
DP1 = P (XU,YU,ZD) * (X - XD) + P (XD,YU,ZD) * (XU - X)
DP2 = P (XU,YD,ZD) * (X - XD) + P (XD,YD,ZD) * (XU - X)
U1 = UP1 * (Y - YD) + UP2 * (YU - Y)
D1 = DP1 * (Y - YD) + DP2 * (YU - Y)
VOXELDATA = U1 * (Z - ZD) + D1 * (ZU - Z)

Fig.26 RELATED ART
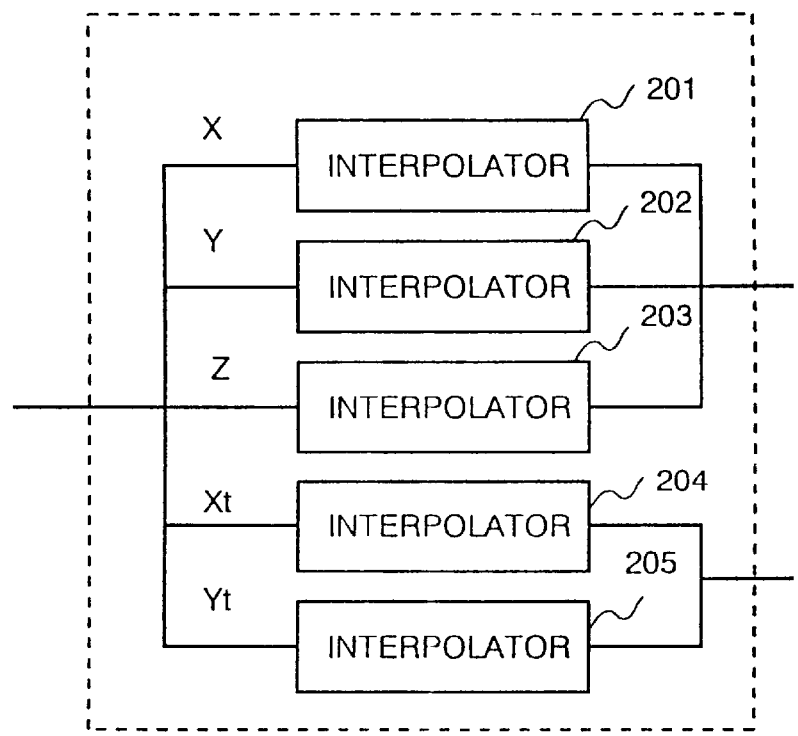
Fig.27A RELATED ART
Fig.27B RELATED ART
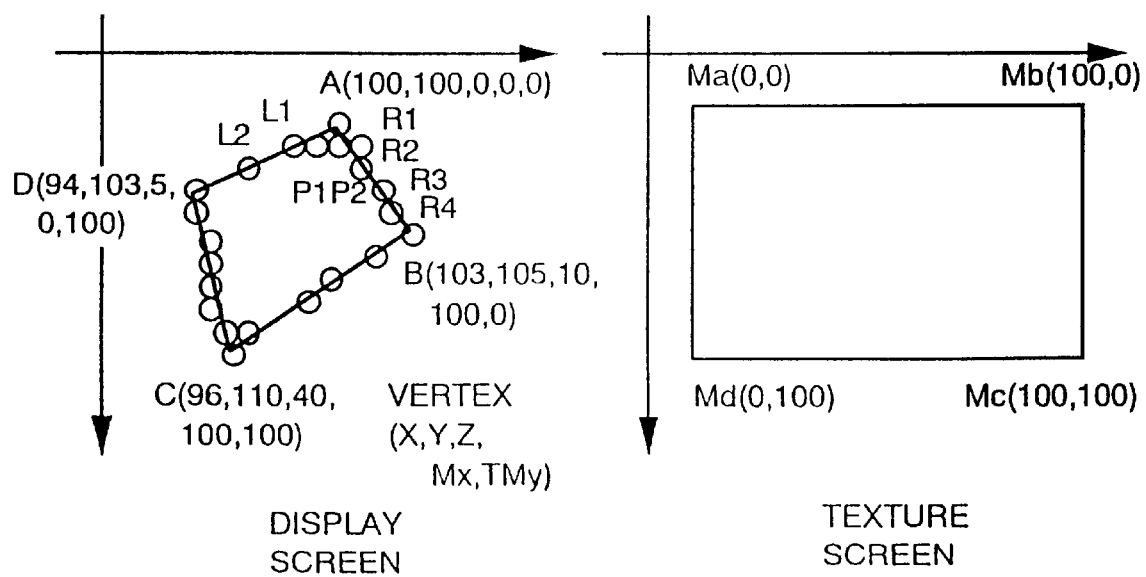
DISPLAY SCREEN
TEXTURE SCREEN

VOLUME RENDERING APPARATUS AND METHOD

BACKGROUND OF THE INVENTION

1. Field of the Invention

This invention relates to a volume rendering apparatus which projects an image of a three-dimensional voxel data on a two-dimensional screen.

2. Description of the Related Art

Volume rendering is a method to visualize a data in a three-dimensional discrete space (volume data) on a two-dimensional plane like display screen, etc., which is obtained by a CT scanner (Computer Tomography scanner) or MRI (Magnetic Resonance Imaging) in a medical field, etc.

FIG. 29 is an explanatory drawing of a volume data and a voxel.

In FIG. 29, a volume data 1000 is illustrated as a three-dimensional cube M×N×L. The volume data 1000 is configured with a plurality of voxels 2000 which are points on three-dimensional grids. Each of the voxels 2000 is represented by each of x, y and z coordinate values and a data called a field data. The field data is a characteristic data given to each of the voxels. A value of the characteristic data is a field value.

For example, when a human head is scanned by a CT scanner, human tissues such as bones, muscles, blood vessels, etc. are scanned. A scanned image is handled as a three-dimensional digital image data, and converted to a form of voxels as illustrated in FIG. 29. In this case, each of the voxels includes a field data of density to give characteristics of the human tissues such as the bones, muscles, blood vessels, etc. in addition to the x, y and z coordinate values. The volume data is displayed by coloring each of the voxels based on each of values of the density. Accordingly, the human tissues are displayed visually, and a condition of a whole data is easily understood. Further, it is easily judged which tissue a voxel represents in a human body by checking a value of the density (field value).

With respect to visualizing the volume data, there are two methods that may be used.

A first method is a surface rendering method. According to the surface rendering method, among the volume data, voxels with same field values are connected, and an isoplethic plane is generated. The volume data is displayed on the isoplethic plane by allocating primitives such as a surface, line, etc. and the volume data is displayed.

According to the surface rendering method, surface graphics are used. In the surface rendering method, an isoplethic plane which is generated by connecting voxel data with same field data (an extension of two-dimensional isoplethic line) is generated, and surfaces and patches are allocated on the isoplethic plane. In this surface rendering method, the volume data is displayed by rendering according to surface graphics. This surface rendering method is also called as a slice-by-slice method.

Among methods to generate an isoplethic plane, there are time-consuming methods such as a marching cubes method, etc. In volume rendering methods according to surface graphics, it is not possible to view all of the volume data. In the volume rendering methods according to surface graphics, only volume data that has field data with a certain field value is displayed.

A second method is a method to display the voxel data directly by a ray casting method, etc.

According to the second method to display the voxel data directly, it is necessary to generate a ray from each of pixels on two-dimensional grids on a displaying plane (a plane on a display). Then, a process similar to a conventionally known ray tracing method is performed to sample the voxel data. This process requires a very large amount of calculation.

This second method is described in Levoy, M., "Display of Surfaces from Volume Data," IEEE Computer Graphics and Applications, Vol. 8, No. 3, pp. 29–37, 1988 and Garrity, M. P., "Raytracing Irregular Volume Data," Computer Graphics, Vol. 24, No. 5, pp. 35–40, 1990.

In order to display the voxel data directly, parallel computers such as a Generalized Object Display Processor Architecture (GODPA), Voxel Processor, Cube and 3DP4, etc. had been developed. For example, the GODPA requires many processors, for example, 64 processing elements (PE), 8 intermediate processors (IP) and one output processor (OP).

In addition to the above first and second methods, there is a volume rendering method in which a volume data is sliced and the sliced image is displayed semi-transparently. This method is called a shading method and it is a simple method to develop sliced cross sections. This shading method is described in Japanese Unexamined Published Patent Application Hei 5-266216 "Volume Rendering Method and an Apparatus." In Hei 5-266216, a sliced plane is divided into a plurality of triangles, and a color data of each of vertices in each of the triangles is obtained from each of voxel data at each of the vertices in each of the triangles. Then, color data of each of voxels which are inside each of the triangles is obtained by interpolating the color data from each of the vertices.

FIG. 22 is a configuration chart of a volume rendering apparatus according to the shading method.

In FIG. 22, a gradient vector calculator 105 calculates a gradient of a vector, a distance calculator 106 calculates a distance to a point of view, and an isoplethic plane extractor 107 extracts an isoplethic plane. An optical attribute calculator 108 calculates a color data and an untransparency level, a three-dimensional (3D) graphics processor 109 has a function of scan conversion for surface rendering, and a volume data first memory 110 stores a volume data. A point of view coordinate memory 111 stores a coordinate value at the point of view, a sampling interval memory 112 stores an interval of sampling, and a volume data second memory 113 stores a result of the gradient vector calculator 105 and a result of the distance calculator 106. A triangle data first memory 114 stores a triangle data which is extracted by the isoplethic plane extractor and a triangle data second memory 116 stores the triangle data including the color data and the untransparency level. A frame buffer 117 is also provided.

An operation of the volume rendering apparatus according to the related art which is illustrated in FIG. 22 is explained in reference with a flow chart of FIG.

In FIG. 23, a volume data is inputted to the volume data first memory 110. A coordinate value at a point of view is inputted to the point of view coordinate memory 111 and a sampling interval of the volume data is inputted to the sampling interval memory 112 (step 101).

A gradient vector of the volume data at a sampling point is calculated by the gradient vector calculator 105. The distance calculator 106 calculates a distance between the volume data and the point of view by using a data in the point of view coordinate memory 111 and a data in the sampling interval memory 112. This result is outputted to the volume data second memory 113 (step 102).

The isoplethic plane extractor 107 extracts a set of points which form triangles with a same distance from the volume data second memory 113, and generates an isoplethic plane. Then, the isoplethic plane extractor 107 outputs the extracted data to the triangle data first memory 114 (step 103).

The optical attribute calculator 108 calculates a color data and an untransparency level at each of vertices of each of the triangles based on data in the triangle data first memory 114, and outputs the result to the triangle data second memory 116 (step 104).

The 3D graphics processor 109 performs scan conversion by using vertex data of each of the triangles which is stored in the triangle data second memory 116 as illustrated in FIG. 24. The 3D graphics processor 109 performs linear interpolation and obtains data at each of pixels (P) inside each of the triangles (step 105).

In step 105, the data at each of the pixels inside each of the triangles is obtained by interpolation, even though a volume data corresponding to each of the pixels already exists. Therefore, the quality of rendering lacks in accuracy. For example, in FIG. 24, each of the circles are pixels, and circles in dotted lines are volume data which are not used. The pixel data indicated by the dotted line circles are obtained by interpolating the volume data at three vertices of each of the triangles.

This result is stored in a frame buffer 117 (step 106). Accordingly, volume rendering is realized.

A texture mapping method is described in Japanese Unexamined Published Patent Application Hei 5-298456. In Hei 5-298456, a two-dimensional texture mapping apparatus is realized.

In FIG. 25, a micro processor 191 comprises a mechanism to divide edges of a polygon into left edges and right edges. A left edge interpolation circuit 192 interpolates the left edges which are divided by the micro processor 191, and a right edge interpolation circuit 193 interpolates the right edges which are divided by the micro processor 191. A pixel interpolation circuit 194 uses two point data which are outputted from each of the left edge interpolation circuit 192 and the right edge interpolation circuit 193, and interpolates a straight line which is parallel with a scan line defined with the two points. A texture memory 195 stores a texture data, and outputs the texture data, which is indicated by a texture address which is outputted by the pixel interpolation circuit 194. A scan converter 196 includes the left edge interpolation circuit 192 and the right edge interpolation circuit 193. As illustrated in FIGS. 27A and 27B, a polygon ABCD is divided into segments L1R1 and L2R2 by the scan converter. Thus, a scan conversion of edges is performed.

FIG. 26 illustrates a sample of the left edge interpolation circuit 192, the right edge interpolation circuit 193 and the pixel interpolation circuit 194 which are illustrated in FIG. 25.

In FIG. 26, an interpolation circuit 201 generates x coordinate values in interpolation on a display screen, an interpolation circuit 202 generates y coordinate values in interpolation on the display screen, an interpolation circuit 203 generates z coordinate values in interpolation on the display screen, an interpolation circuit 204 generates x coordinate values Xt in interpolation on a texture plane, and an interpolation circuit 205 generates y coordinate values Yt in interpolation on the texture plane.

An operation of the texture mapping apparatus according to the related art is explained in reference with FIGS. 25, 26 and 27.

For the micro processor 191, x, y and z coordinate values of vertex data A, B, C and D of a polygon which is displayed on a screen and texture addresses Mx and My of each of vertices Ma, Mb, Mc and Md corresponding to each of the vertices A, B, C and D are provided. The micro processor 191 divides edges of the polygon, which is displayed on the screen, to left edge ADC and right edge ABC. The micro processor 191 also divides edges of the texture corresponding to each of the vertices of the polygon to edges MaMbMc and edges MaMdMc. This division of the polygon is performed so that a vertex with a maximum y coordinate value and a vertex with a minimum y coordinate value become endpoints of the edges.

Then, the x, y and z coordinate values of the vertex A, which is a start point for each of the left edge and the right edge, and the x coordinate value Mx and the y coordinate value My of the vertex Ma corresponding to the vertex A on the texture plane, are provided in each of the interpolation circuits 201, 202, 203, 204 and 205 for each of x, y, z, Mx and My in each of the left edge interpolation circuit 192 and the right edge interpolation circuit 193.

The micro processor 191 computes each of interpolation values for x, y, z, Mx and My at a start point A of each of the interpolation circuits. The interpolation value is a fraction of a difference of each of coordinate values of the edges with a difference of y coordinate values. The interpolation value of y is fixed at 1.

In each of the interpolation circuits, an interpolation value is added to each of the values at the start point sequentially, and interpolation is performed from a point with the minimum y coordinate value positively along a y-axis. As a result, the left edge interpolation circuit 192 creates points L1, L2 and D, and the right edge interpolation circuit 193 creates points R1, R2, R3, R4 and B.

In this edge interpolation, for the direction of the y-axis, a same interpolation value (=1) is added in both the left edge interpolation circuit 192 and the right edge interpolation circuit 193. Therefore, a point on the left edge and a point on the right edge which are outputted from each of the edge interpolation circuits are on a same scan line.

For example, in a first interpolation, starting from the point A, the vertex L1 is created from the left edge interpolation circuit 192, and the vertex R1 is created on a line with a same y coordinate value with L1 from the right edge interpolation circuit 193. The vertices R1 and L1 are on a same scan line.

The pixel interpolation circuit 194 creates points connecting vertices which are outputted from the left edge interpolation circuit and the right edge interpolation circuit. For example, points P1 and P2 which connect the vertices L1 and R1 are created. Data of coordinate values x, y, z, Mx and My of the vertex L1, which are outputted from the left edge interpolation circuit 192, are inputted to each of the interpolation circuits as start point data of the pixel interpolation circuit 194.

The micro processor 191 reads data of the vertices L1 and R1 which are outputted from the left edge interpolation circuit 192 and the right interpolation circuit 193, and computes interpolation values to create points on a segment L1R1 on a scan line.

The interpolation value is a fraction of each of differences of coordinate values z, Mx and My between two vertices with a difference of x coordinate values between the two vertices. The computed interpolation values are provided in each of the interpolation circuits in the pixel interpolation circuit 194.

In this process, interpolation is performed in a unit of a pixel. Therefore, an interpolation value for a direction of the x-axis is determined as 1, and an interpolation value for a direction of the y-axis is determined as 0 to keep the y value unchanged. The pixel interpolation circuit 194 operates similarly with the edge interpolation circuits, and creates the points P1 and P2 on the scan line.

X, y and z coordinate values of points are outputted from the pixel interpolation circuit 194 and inputted to the frame memory, and Mx and My coordinate values are inputted to the texture memory as a texture address.

The texture memory outputs color data R, G and B of address, which is indicated with Mx and My coordinate values, to the frame memory. Then, an image is rendered on a screen based on the x, y and z coordinate values and the color data R, G and B, which are outputted to the frame memory.

The volume rendering apparatus according to the ray tracing was configured as stated. Therefore, a special hardware for volume rendering was necessary to achieve high speed ray tracing. When the processing was performed by software, processing speed became low.

According to the shading method to overlap sliced cross sections, a color value and an untransparency level of each of pixels inside of each of the triangles were obtained by interpolating sampled vertices. Therefore, there was a possibility that a different image from a real volume data was created for the inside of each of the triangles. Furthermore, when the volume data was either extended or reduced in size, a sampling interval of the volume data became long. Hence, a correct rendering image is not created. Since each of volume data corresponding to each of the pixels exists, the quality of display should be able to be improved by using each of the volume data of each of the pixels.

SUMMARY OF THE INVENTION

It is an object of this invention to solve the aforementioned problems. Particularly, this invention intends to provide a volume rendering apparatus by improving the controlling method of existing mapping apparatus such as texture mapping apparatus.

Furthermore, this invention intends to provide a volume rendering apparatus, wherein an accurate volume image is rendered, by obtaining accurate volume data of pixels on the volume plane when the volume data corresponding to each of the pixels exists instead of interpolating each of the pixels inside of each of the triangles, and by obtaining data of the pixels on the volume plane by interpolating the volume data when the volume data doesn't exist.

According to one aspect of this invention, a volume rendering apparatus includes a voxel memory for storing three-dimensional volume data, a processor for providing three-dimensional volume data representing an object to the voxel memory as a volume object, and for providing a point of view coordinate space, a direction of view, and a mapping object on which the volume object is to be mapped in the point of view coordinate space, a two-dimensional rendering unit, coupled to the processor, for generating at least one two-dimensional volume plane representing at least one slice of the volume object that is orthogonal to the direction of view, for generating at least one two-dimensional mapping plane representing at least one slice of the mapping object that is orthogonal to the direction of view, for mapping the three-dimensional volume data within the at least one two-dimensional volume plane on the at least one two-dimensional mapping plane, and for blending the mapped three-dimensional volume data to generate blended data, and an image memory for storing the blended data.

According to another aspect of this invention, a volume rendering method includes steps of receiving a volume object for three-dimensional volume data and a mapping object corresponding to the volume object, receiving a direction of view for the volume object, generating a plurality of volume planes orthogonal to the direction of view and a plurality of mapping planes corresponding to the volume object, performing two-dimensional texture mapping for each of the plurality of mapping planes by using each of the plurality of volume planes as a texture plane, and blending three-dimensional volume data that is mapped on each of the plurality of mapping planes and storing blended data in an image memory.

Other objects features, and advantages of the invention will be apparent from the following description when taken in conjunction with the accompany drawings.

BRIEF DESCRIPTION OF THE DRAWINGS

FIG. 1 shows a concept of the volume rendering apparatus of embodiment 1;

FIG. 4 illustrates an operation of the volume rendering apparatus of FIG. 1;

FIG. 5 shows a flow chart of the apparatus in FIG. 1;

FIG. 11 shows a flow chart of the volume rendering apparatus of embodiment 2;

FIG. 16 shows a configuration chart of a volume rendering apparatus which uses an image memory as a frame memory according to embodiment 4;

FIG. 17 shows a configuration chart of a volume rendering apparatus which includes a separate frame memory in addition to the image memory, according to embodiment 5;

FIG. 26 shows a configuration chart of edge interpolation circuits and a pixel interpolation circuit according to the texture mapping apparatus of the related art;

FIGS. 27A and 27B illustrate division of edges according to the texture mapping apparatus of the related art;

DESCRIPTION OF THE PREFERRED EMBODIMENTS

Embodiment 1

Figure 2A:
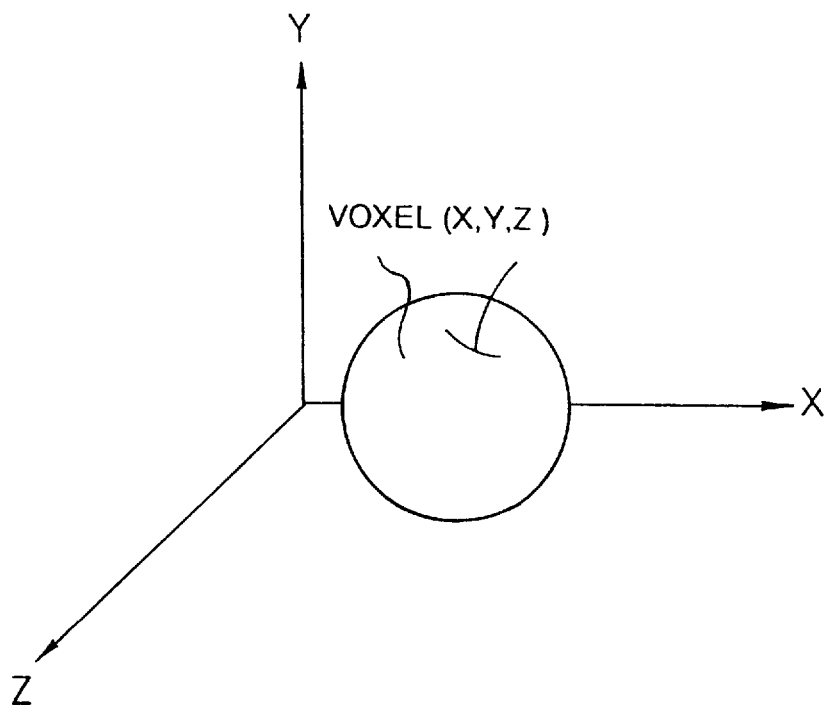
FIGS. 2A and 2B illustrate a voxel and a volume data.

In this embodiment, a plurality of volume planes is generated from a volume data and each of the volume planes is mapped on a mapping plane to generate a mapped image. The mapped image is stored in an image memory as an image to be displayed. The mapped image generated from the next volume plane and the image to be displayed which is previously stored in the image memory are blended according to a predetermined blending ratio by a blender. The blended image is written back to the image memory as a revised image to be displayed.

In this invention, the volume data includes each of coordinate values at each of points (voxels) in a three-dimensional volume image and each of color data at each of coordinate points. A three-dimensional object which is recognized by the volume data is called a volume object. A three-dimensional object on which the volume data is mapped is called a mapping object.

A configuration of a volume rendering apparatus according to this invention is explained in reference with FIG. 1.

In FIG. 1, a micro processor 10 stores each of coordinate values at a point of view which is provided in a given volume space. The micro processor 10 also stores a sampling interval and each of coordinate values at each of vertices of the volume object and the mapping object. Further, the micro processor 10 generates a color data based on density data which is obtained by a $CT_9$ MR1, etc. Human tissues such as bones and muscles, etc. are characterized by the density data.

In FIG. 1, a voxel memory 11 obtains coordinate values and the color data of a three-dimensional image of a rendering volume data from the micro processor 10. A parameter provider 12 receives the coordinate values at the point of view, the sampling interval and the coordinate values at each of the vertices of the volume object and the mapping object. The parameter provider 12 slices the volume object based on the coordinate value at the point of view, the sampling interval and the coordinate values at each of the vertices of the volume object and determines a volume plane. The parameter provider 12 also determines a three-dimensional mapping plane, on which the volume plane is mapped in a point of view coordinate system space based on the coordinate values at the point of view, the sampling interval and the coordinate values at each of vertices of the mapping object. The three-dimensional mapping plane is a two-dimensional plane which is expressed by a three-dimensional coordinate in the point of view coordinate system space. The parameter provider 12 further performs graphics processing on the three-dimensional mapping plane, and converts the three-dimensional mapping plane to a two-dimensional mapping plane. The two-dimensional mapping plane is a two-dimensional plane which is expressed by a two-dimensional coordinate in a fixed mapping plane. According to the graphics processing, the parameter provider controls each of data in directions of x, y and z axes separately.

In FIG. 1, an address generator 13 generates a voxel memory address which shows each of voxels on the volume plane and an image memory address by an image memory 14 which shows the mapping plane. The image memory 14 stores mapping data of the volume plane on the mapping plane. The image memory 14 is able to read/write data which is indicated with the image memory address. A blender 15 blends data which is received from the voxel memory 11 and a data which is received from the image memory 14 in accordance with a determined blending ratio A two-dimensional rendering unit 900 is provided as one of elements for a texture mapping apparatus.

The voxel memory 11 and the image memory 14 are also necessary elements for a texture mapping apparatus. In this invention, two-dimensional texture mapping apparatus is arranged extensively for three-dimensional volume rendering according to slicing of three-dimensional data to two-dimensional data and blending of the two-dimensional data by the blender.

Figure 2B:
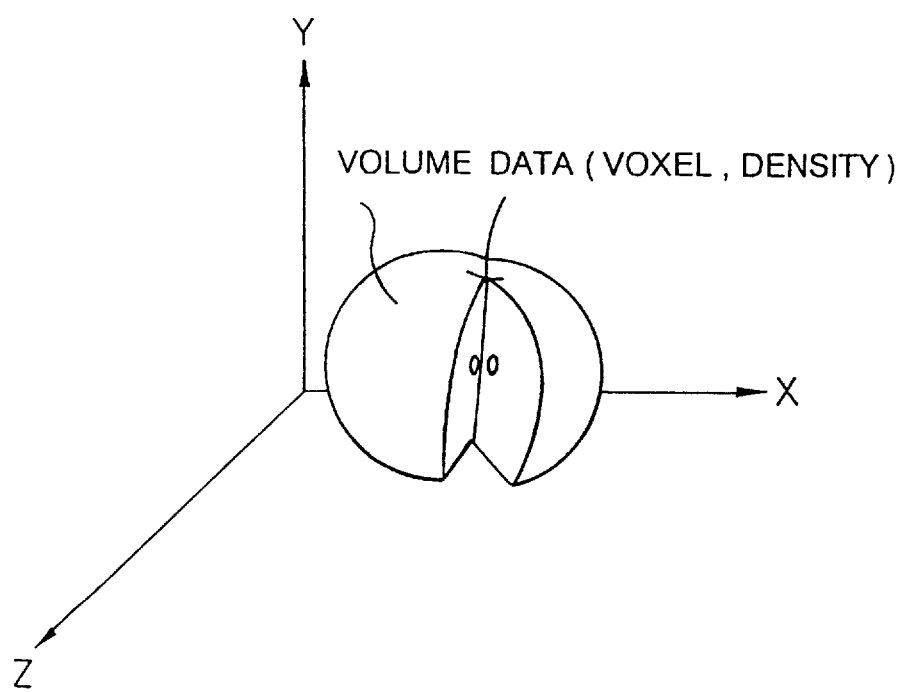
Figure 3:
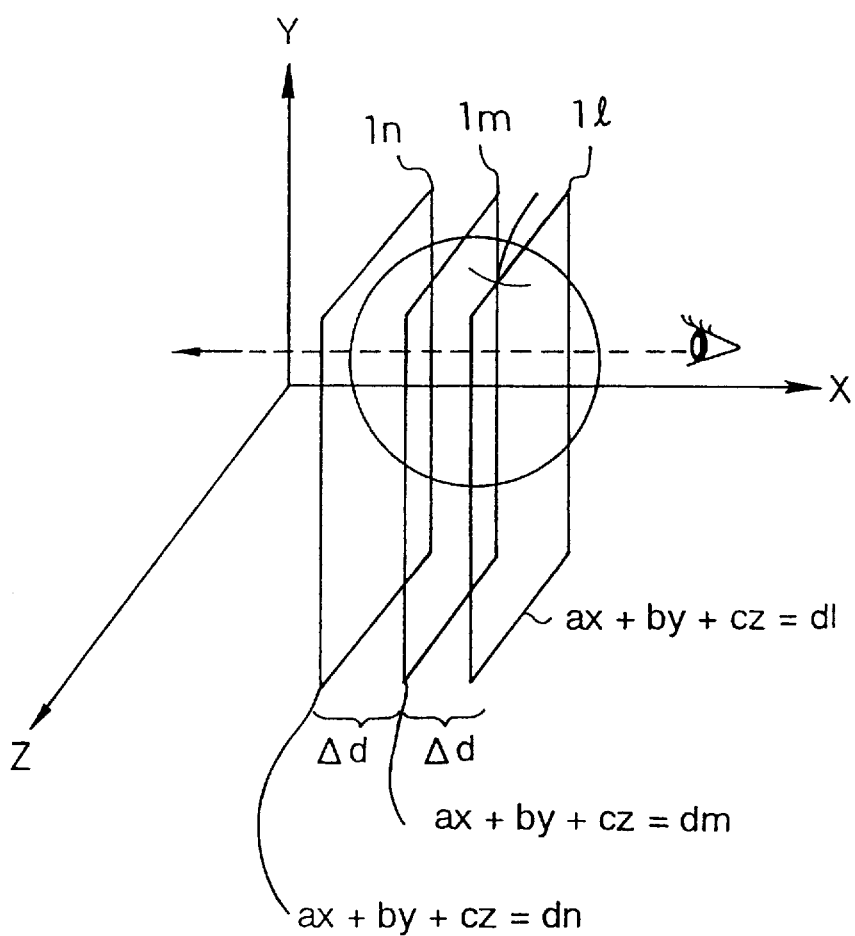
FIG. 3 illustrates a volume object to explain a process of slicing the volume object vertically to a direction of view and generating a plurality of volume planes.

With reference to FIGS. 2A and 2B and FIG. 3, a relationship between the voxel and the volume data and the volume plane are explained.

FIG. 2A and 2B illustrate the relationship between the voxel and the volume data. In FIG. 2A, a three-dimensional image of an apple is rendered in a three-dimensional coordinate system, and each of points (x, y, z) on three-dimensional coordinate grids is a voxel. When a part of the apple in FIG. 2A is sliced, a part of an inside of the apple appears as shown in FIG. 2B. In FIG. 2B, a peel skin, a mesocarp, a core and seeds of the apple are rendered. The volume data includes characteristic data of each of the materials which constitute the peel skin, the mesocarp, the core and the seeds and distinguishes them each other as field data.

FIG. 3 shows a process of generating a volume plane by slicing a volume object orthogonally to a view vector (dotted arrow in FIG. 3) starting from the point of view. In FIG. 3, the view vector is parallel with x-axis. However, the point of view can be any coordinate point, and the view vector can be in any direction.

In FIG. 3, volume planes 1$l$, 1$m$ and 1$n$ which are generated with a sampling interval $\Delta d$ are illustrated. The volume planes 1$l$, 1$m$ and 1$n$ are described with the following three-dimensional plane equations. The volume plane 1$l$ is $ax+by+cz=dl$. The volume plane 1$m$ is $ax+by+cz=dm$. The volume plane 1$n$ is $ax+by+cz=dn$. In these equations, dl, dm and dn are fixed numbers which are determined by the sampling interval $\Delta d$. The volume planes which are illustrated in FIG. 3 are planes which are generated by slicing the volume object orthogonally to the view vector with a predetermined sampling interval $\Delta d$.

Operations are explained with reference to FIG. 4. At first, an overview of this method is explained.

In this method, a volume object which is defined with a volume data and a mapping object on which the volume data is mapped is provided. For example, in case that both of the volume object and the mapping object are hexahedrons, each of vertices of each of the objects are corresponded.

Information of the volume object is mapped on the mapping object in accordance with the corresponding relationship of each of vertices of the volume object and each of vertices of the mapping object.

According to the mapping method of this invention, mapping processing which is similar to texture mapping processing is performed between a volume plane and a mapping plane in accordance with the corresponding relationship of each of the vertices of the volume object and each of the vertices of the mapping object. As described later, when a plurality of sliced mapping planes is stored in the image memory 14, blending is performed. Volume rendering is performed in this way.

According to this method, an original volume data which is received from the voxel memory is sliced with a plurality of planes with different distances, and the sliced volume planes are mapped on the mapping plane. In this method, since the mapping objects are displayed in multi-layers including distance data, a correct data is able to be obtained. Further, a texture mapping apparatus or a principle of the texture mapping apparatus is able to be used.

In reference with a flow chart of FIG. 5, the configuration chart of FIG. 1 and FIG. 4, operations are explained.

In this explanation, it is assumed that a two-dimensional sectional image is obtained by a CT scanner, MRI or supersonic sensor. It is also assumed that image processing, color calculation, etc. is performed for the two-dimensional sectional image by a micro processor and stored in the voxel memory 11 as a volume data.

At first, a volume object in a volume space is defined in the voxel memory 11 to display a three-dimensional volume data (step 1, similar to steps 101 in the related art). In this process, the micro processor sends each of coordinate values of vertices Ab–Hb of the volume object which is illustrated in (a) of FIG. 4 to the parameter provider 12. The micro processor further sends a coordinate value of a point of view, a sampling interval Δd and blending ratio (α), which are determined by a user, to the parameter provider 12.

Then, the parameter provider 12 provides a mapping object on which the volume object is mapped in a point of view coordinate system space (step 2). For example, a cube as illustrated in (d) of FIG. 4 is provided as a mapping object to map the volume object which is a cube that is stored in the voxel memory 11 and illustrated in (a) of FIG. 4. The cube can be either in a same size or in a different size. In this process, the parameter provider 12 corresponds each of Av, Bv, Cv, Dv, Ev, Fv, Gv and Hv (Hv is not shown) in the mapping object in a point of view coordinate system space with each of Ab, Bb, Cb, Db, Eb, Fb, Gb and Hb in the volume object in the volume memory space.

Then, an equation to describe a volume plane to slice the volume object is obtained. The volume plane is determined with a point of view and a direction of a view vector which are defined in a volume space (step 3).

As illustrated in (b) of FIG. 4, there are a plurality of volume planes 1a, 1b, 1c and 1d according to the sampling interval Δd which is received from the micro processor The volume planes in the volume space in (b) of FIG. 4 are extracted as the volume planes in the voxel memory space as illustrated in (c) of FIG. 4. In (c) of FIG. 4, volume planes which include at least a part of an apple are extracted from the volume object. As explained in FIG. 3, when the view vector is (a, b, c), the volume plane is able to be described with the following equation (1):

$$ax+by+cz=d \qquad (1)$$

Then, according to the corresponding relationship between the volume object and the mapping object, an equation to describe a three-dimensional mapping plane which slices the mapping object is obtained (step 4, similar to step 103 in the related art). As illustrated in (d) of FIG. 4, there are a plurality of three-dimensional mapping planes 2a, 2b, 2c and 2d according to the sampling interval Δd which is received from the micro processor 10. The three-dimensional mapping planes in the mapping space illustrated in (d) of FIG. 4 are extracted as the two-dimensional mapping planes as in (e) of FIG. 4. When the view vector is (a1, b1, c1) and the view vector is defined as a normal vector, a three-dimensional mapping plane is described with the following equation (2):

$$a1x+b1y+c1z=d1 \qquad (2)$$

In the equations (1) and (2), d and d1 are arbitrary fixed numbers which are determined with a sampling interval and each of distances between each of the points of view and each of the volume plane or the three-dimensional mapping plane respectively. In (1) and (2), each of d and d1 reflects distance between each of the points of view and each of the planes. A plurality of sectional planes is able to be provided by changing each of values of d and d1.

In (b) of FIG. 4, a plurality of volume planes 1a, 1b, 1c and 1d is generated by changing the value of the fixed number d. The fixed number d may be determined arbitrarily depending on a configuration of the volume object. In (d) of FIG. 4, a plurality of three-dimensional mapping planes 2a, 2b, 2c and 2d is generated by changing the value of the fixed number d1.

These operations of the volume plane and the mapping plane are performed by the parameter provider 12. The parameter provider 12 calculates and outputs each of parameters a, b, c and d of the volume plane to an address generator 13. The parameter provider 12 calculates and outputs each of the parameter a1, b1, c1 and d1 of the two-dimensional mapping plane in the two-dimensional image memory space by converting the three-dimensional mapping plane to the two-dimensional mapping plane by an already known graphics processing method.

In (c) of FIG. 4, each of sliced volume planes 1b, 1c and 1d (1a is omitted) is illustrated. In (e) of FIG. 4, each of two-dimensional mapping planes 2a, 2b, 2c and 2d, which are produced by converting the three-dimensional mapping planes to a space in the two-dimensional image memory 14 is illustrated.

The address generator 13 generates each of voxel memory addresses of voxels which constitute the volume plane by interpolating along each of x, y and z orthogonal coordinate axes in the voxel coordinate system space. The address generator 13 also generates each of image memory addresses of pixels which constitute the mapping plane by interpolating along each of x and y orthogonal coordinate axes and z coordinate axis (step 5, similar to step 105 in the related art).

Figure 6A:
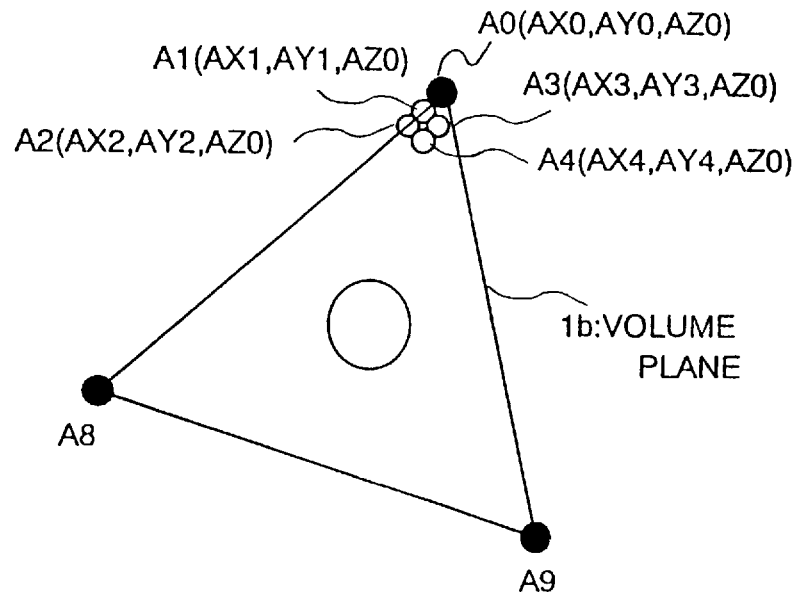
FIGS. 6A and 6B illustrate an interpolation process.
Figure 6B:
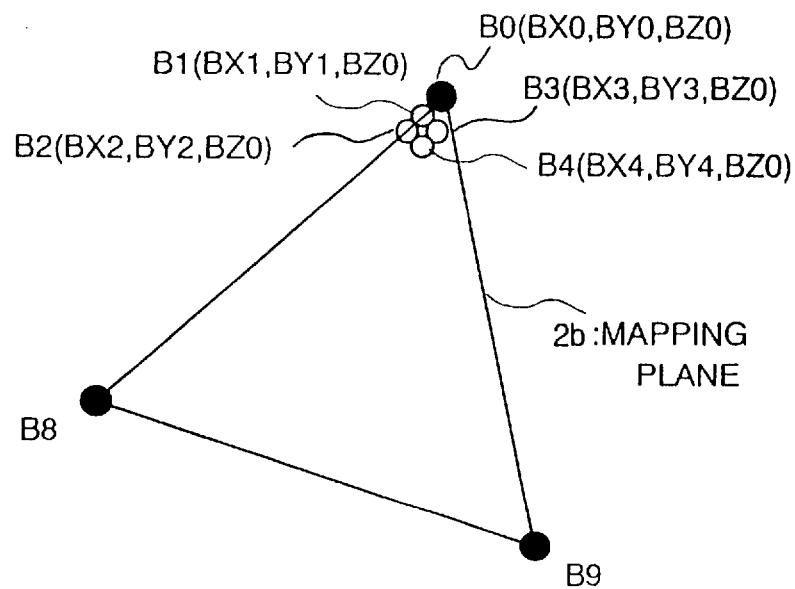
Figure 7:
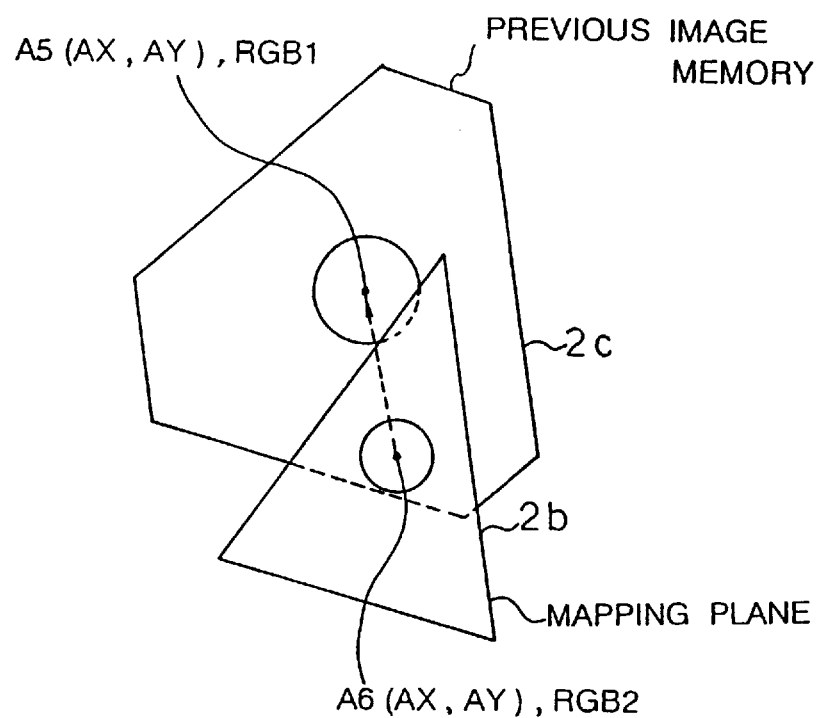
FIG. 7 illustrates a mapping process.

With reference to FIGS. 6A and 6B and FIG. 7, an interpolation process and a mapping process by the address generator 13 are explained. Hereinafter, the address generator 13 operates similarly to a texture mapping apparatus according to the related art. Details of the operation are explained later in embodiment 3. In embodiment 1, only an outline of the operation is explained.

In FIG. 6A, a volume plane 1b corresponds to the volume plane 1b of (c) of FIG. 4. The volume plane 1b includes vertices A0, A8 and A9. By starting interpolating from vertex A0, voxel memory addresses of points A1 and A2 which are on edge A0–A8 are obtained. Further, voxel memory addresses of points A3 and A4 which are within a triangle A0A8A9 are obtained. The address generator 13 obtains points on each of edges of the triangle A0A8A9 and each of points within the triangle by interpolating from each of vertices A0, A8 and A9. at each of vertices and points on a same plane, each of z coordinate values are same.

The mapping plane 2b in FIG. 6B corresponds to the two-dimensional mapping plane 2b in (e) of FIG. 4. The two-dimensional mapping plane 2b includes vertices B0, B8 and B9. By starting interpolating from the vertex B0, each of the image memory addresses of points B1 and B2 which are on edge B0–B8 is obtained. Further, each of the image memory addresses of points B3 and B4 which are within the triangle B0B8B9 are obtained. The address generator 13 obtains points on each of edges of the triangle B0B8B9 and each of points within the triangle by interpolating from each of vertices B0, B8 and B9.

The address generator 13 sends the generated voxel memory addresses (AX, AY, AZ in FIG. 1) to the voxel memory 11. The address generator sends the generated image memory addresses (BX, BY, BZ in FIG. 1) to the mapping unit 15b.

Then, the voxel memory 11 outputs each of volume data (R, G and B in FIG. 1) which are indicated by each of the voxel memory addresses from the address generator 13 and sends each of the volume data to the mapping unit 15b. The mapping unit 15b performs mapping of each of the volume data at each of the image memory addresses which are received from the address generator 13 (step 6). For example, in FIG. 7, a volume data RGB2 is mapped at an address A6 (AX, AY) on the mapping plane 2b. The mapping unit 15b sends each of the image memory addresses and each of the volume data to the blender 15a.

The image memory 14 extracts each of image data based on each of the addresses received from the address generator 13 through the blender 15a, and sends the extracted image data to the blender 15a ("R, G, B" in FIG. 1). The blender 15a generates a new revised image. The blender 15a blends a volume data received from the mapping unit 15b and an image data of an old image which is received from the image memory 14 (step 7).

When a data on the mapping plane 2b is S, a data on the old image memory 2c is Dold and a new data after blending is Dnew, the new data after blending is able to be obtained with the following equation:

$$Dnew = \alpha S + (1-\alpha)Dold \quad (3)$$

($\alpha$ is a blending ratio, $0 \leq \alpha \leq 1$)

The address generator 13 sends the blending ratio $\alpha$ to the blender 15a. The blended new data is written in an address which is read out by the image memory 14.

As illustrated in FIG. 7, the blender 15a calculates a new revised data from data RGB2 at address A6 (AX, AY) in the mapping plane and data RGB1 at corresponding address A5 (AY, AY) in the image memory by using the equation (3) and obtains a new revised data.

When the blending ratio ($\alpha$) is 70%, the new data Dnew is 0.7×RGB2+0.3×RGB1. When RGB1 is red and RGB2 is blue, the new data of 70% blue and 30% red, i.e., royal blue is produced. As stated, when the volume plane is mapped on the mapping plane and blending is performed repeatedly, a volume rendering image as illustrated in (f) of FIG. 4 is produced.

Figure 28:
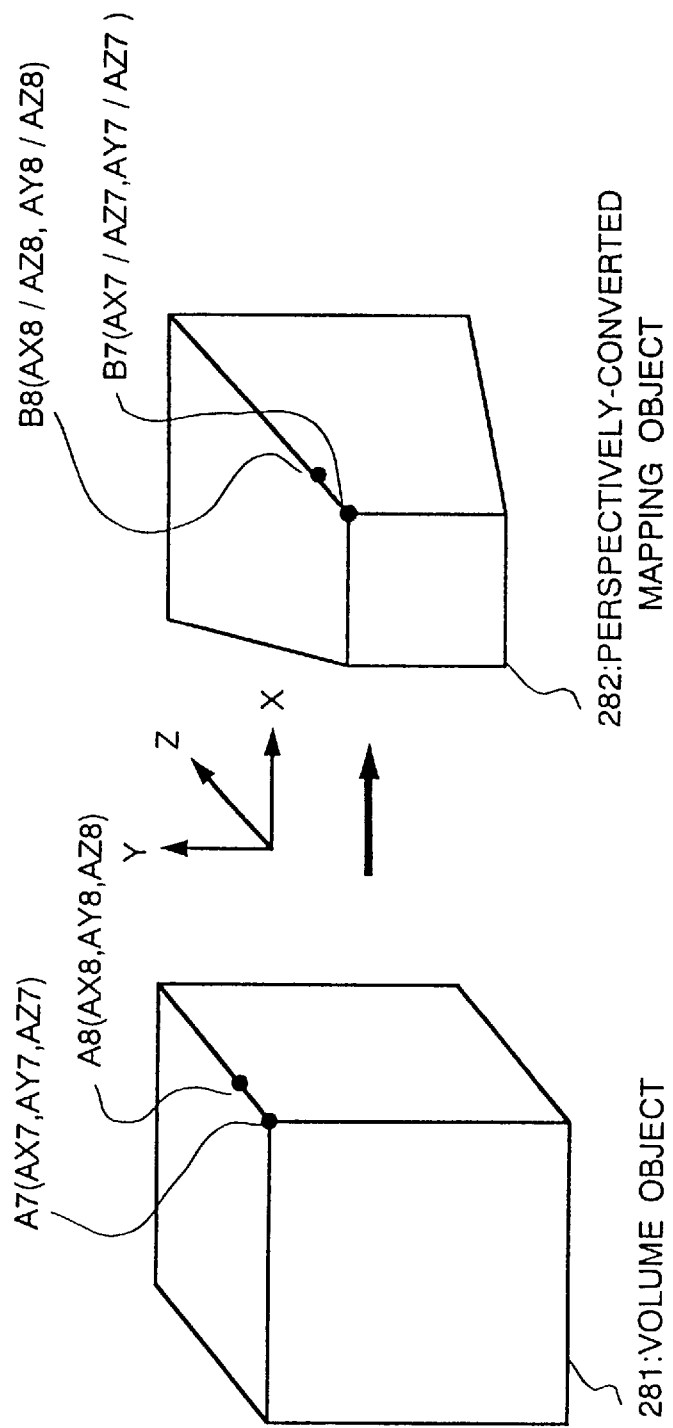
FIG. 28 illustrates volume rendering which includes perspective transformation by the texture mapping apparatus of the related art.
Figure 29:
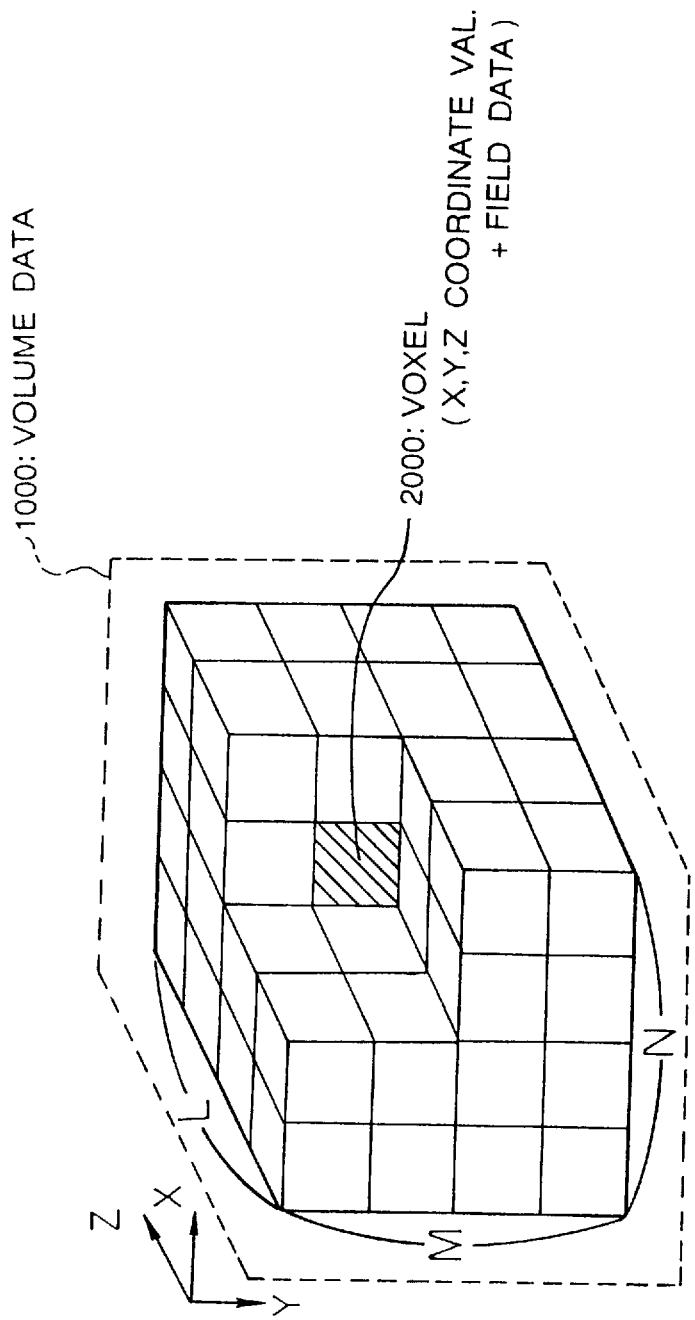
FIG. 29 illustrates a volume data and a voxel.

According to the related art, when an image with a perspective effect is produced from a volume data, the whole volume data must be divided with value z, which is a depth. For example, as shown in FIG. 28, A7 (AX7, AY7, AZ7) on a volume object is converted to B7 (AX7/AZ7, AY7/AZ7) on a mapping object by perspective conversion. A8 (AX8, AY8, AZ8) on the volume object is converted to B8 (AX8/AZ8, AY8/AZ8) on the mapping object by perspective conversion.

However, according to a method of this embodiment 1, when a mapping object is provided in step 2, division with value Z, which is a depth, is performed to produce only each of vertices of the mapping object. Points between each of the vertices are produced by interpolating each of the vertices. In this way, a more realistic perspective effect is realized.

In embodiment 1, a texture mapping apparatus according to the related art is extended to process a three-dimensional space in order to achieve a correct three-dimensional perspective effect. This is achieved by providing a blender to the texture mapping apparatus.

The volume rendering apparatus according to an embodiment of the invention is intended to utilize the texture mapping apparatus according to the related art as much as possible. In an embodiment of the invention, the three-dimensional volume data are sliced into data of two-dimensional planes, and hardware and software which are used in the texture mapping apparatus according to the related art are able to be utilized. Therefore, according to the volume rendering apparatus in this invention, special hardware and special software are not necessary to process the three-dimensional volume data. Hence, cost is saved.

Figure 24:
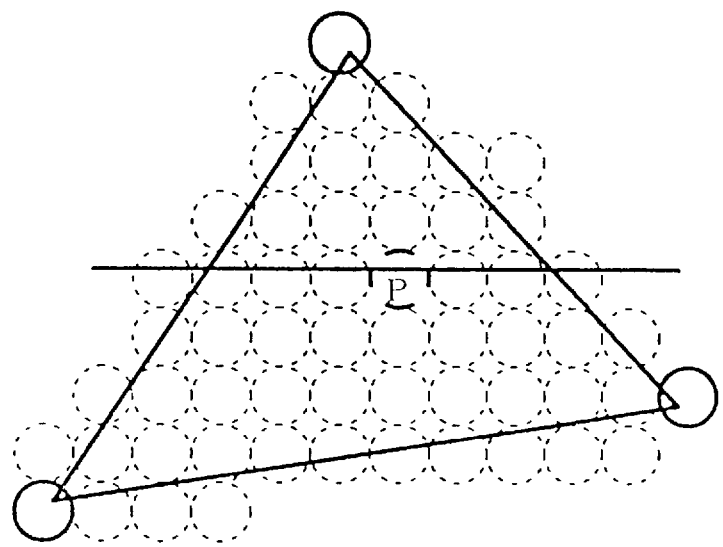
FIG. 24 illustrates an accuracy of pixels according to interpolation shading of the related art.
Figure 25:
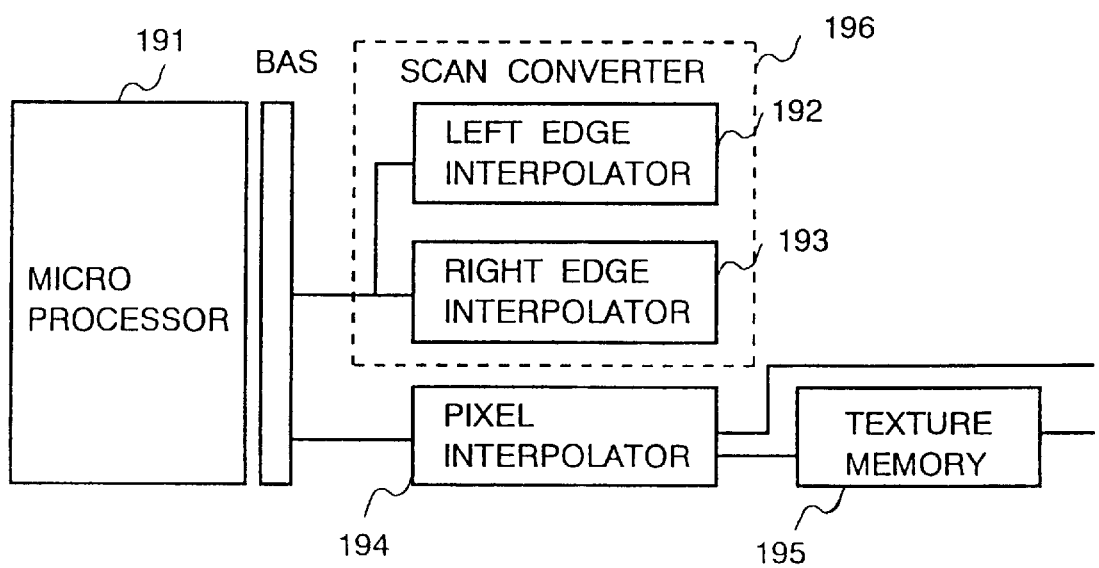
FIG. 25 shows a configuration chart of a texture mapping apparatus according to a texture mapping apparatus of the related art.

The method according to embodiments of this invention is different from a method according to the related art which is illustrated in FIG. 24. In the related art, each of data of each of the pixels within a triangle is produced by linear interpolation. On the other hand, in embodiment 1, though each of points on the volume plane is produced by interpolating each of the vertices, each of color data is retrieved from the voxel memory based on each of coordinate values of the voxels.

The volume rendering apparatus according to embodiment 1 calculates a parameter of a volume plane which slices a volume object vertically to a view direction by a parameter provider. The parameter provider provides a mapping object on which the volume object is mapped in a point of view coordinate system, and calculates a parameter of a three-dimensional mapping plane which slices the mapping object so that the mapping plane corresponds to the volume plane. The three-dimensional mapping plane is further converted to a two-dimensional mapping plane by the parameter provider 12.

The address generator 13 produces a voxel memory address which shows a volume plane and an image memory address which shows a mapping plane by interpolation technique. The mapping unit 15b performs mapping of the volume plane on the mapping plane. The image memory writes back an image which is outputted by the blender. Then, the blender performs blending of a data which is outputted from the voxel memory on the mapping plane, and a blended volume rendering data, which is semi-transparent, is produced.

Figure 8:
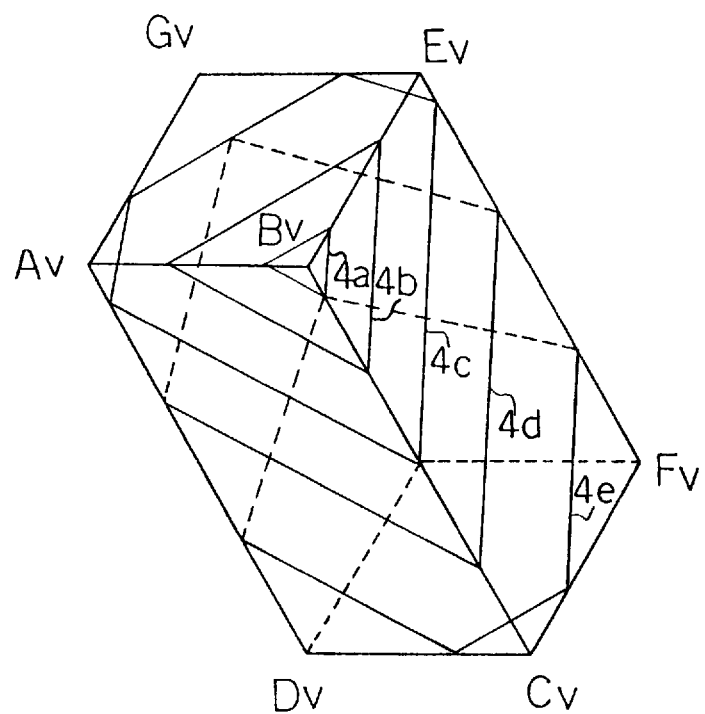
FIG. 8 illustrates another example of a mapping object.

In FIG. 4, the mapping object was a cube which is in a same size with the volume object. It is also possible to provide a mapping object which is a rectangular solid as illustrated in FIG. 8. In the rectangular solid, each of edge Av–Dv, edge Bv–Cv, edge Ev–Fv, edge Gv–Hv (Hv is not illustrated in FIG. 8) are longer than each of corresponding edges of the mapping object in (d) of FIG. 4.

Figure 9A:
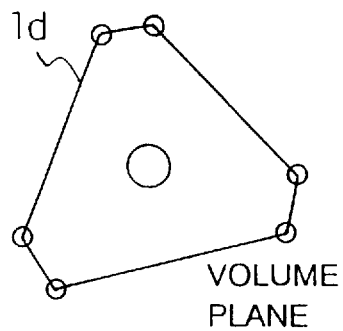
FIGS. 9A, 9B and 9C illustrate a mapping process.
Figure 9B:
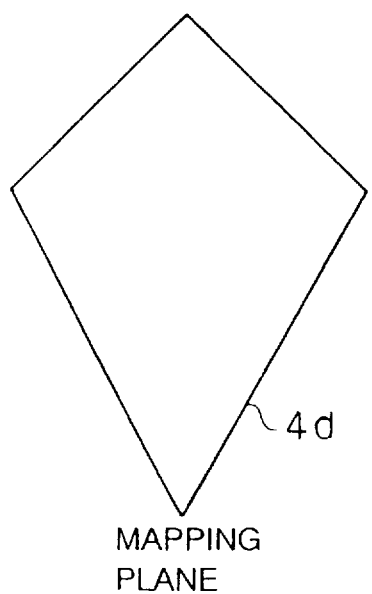
Figure 9C:
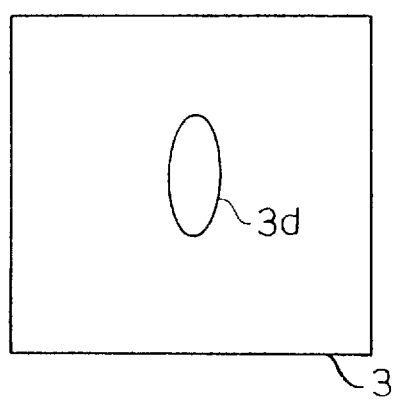

When the mapping object is a rectangular solid as illustrated in FIG. 8, mapping processing is performed as illustrated in FIGS. 9A, 9B and 9C.

FIG. 9A is a volume plane which is similar to the volume plane 1d of (c) of FIG. 4. FIG. 9B is a mapping plane which is similar to the mapping plane 4d in the mapping object of FIG. 8.

The mapping unit 15b performs mapping of the volume data which is outputted from the voxel memory at an image memory address on the mapping plane which is outputted from the address generator 13. When volume plane is mapped on the mapping plane, an image as illustrated in FIG. 9C is produced. Since the mapping plane is longer in length than the volume plane, a circle on the volume plane 1d is produced as an oval on the mapping plane. In this process, the blender performs blending in a similar manner to the operation which was explained in reference with FIG. 7. When blending is performed by mapping the volume plane on the whole mapping plane, an image which is an oval is produced in the image memory as illustrated in FIG. 9C.

Embodiment 2

Embodiment 2 deals with volume rendering in cases where a volume plane and a voxel memory space intersect each other in a complicated manner.

Figure 10C:
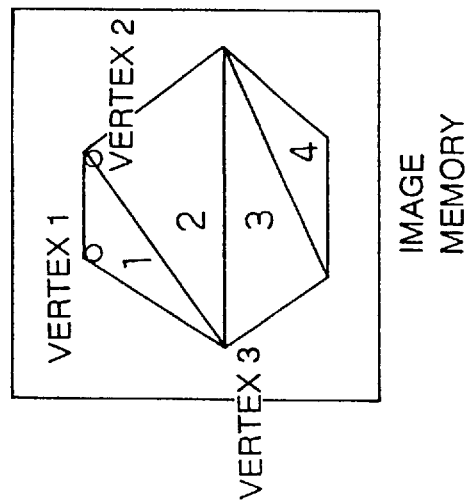
FIGS. 10A, 10B and 10C illustrate an operation of the volume rendering apparatus in embodiment 2.
Figure 10B:
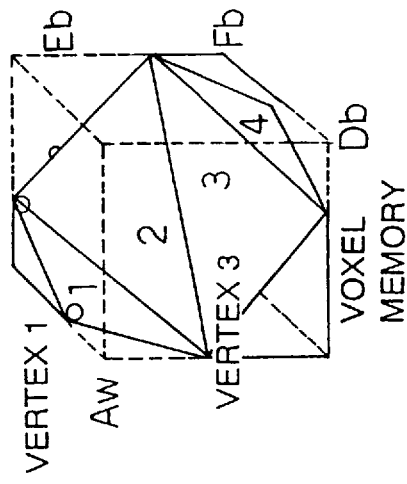
Figure 10A:
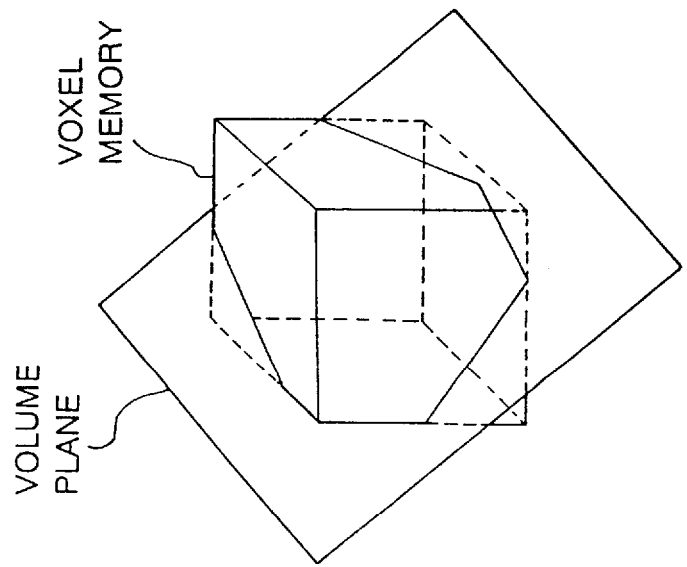

A concept of a volume rendering apparatus according to embodiment 2 is explained in reference with FIGS. 10A, 10B and 10c.

In FIG. 10A, an intersection of the volume plane and the voxel memory space is in a complicated shape. In this case, the intersected polygon is divided to triangles 1, 2, 3 and 4 as illustrated in FIG. 10B. In FIG. 10B, the polygon is divided according to a triangle strip method. However, the polygon may be divided in any method. An operation flow chart of FIG. 11 is obtained by adding a triangle division step (step 5b) to the flow chart of FIG. 5 of embodiment 1.

The mapping plane is also divided to triangles 1, 2, 3 and 4 as shown in FIG. 10C like the volume plane. The parameter provider 12 provides each of the divided triangles in the address generator 13. The address generator 13 interpolates addresses within each of the triangles of each of the volume plane and the mapping plane along a scan line of the image memory, and performs mapping as in embodiment 1. Since all the divided triangles are provided to the address generator, the sectional plane in a complicated shape is able to be rendered, and a volume rendering image is able to be generated.

The stated method of dividing a polygon to triangles has an advantage in that complicated process control is not necessary even if the volume plane or the mapping plain is a polygon.

In embodiment 2, the parameter provider divides a volume plane which is a polygon to a plurality of triangles. The parameter provider also divides a corresponding a three-dimensional mapping plane which is a polygon to a plurality of triangles. The parameter provider further converts each of the triangles on the volume plane and the mapping plane to each of triangles on a two-dimensional mapping plane. At the same time, the address generator generates each of voxel memory addresses to show the volume plane and each of image memory addresses to show the mapping plane for each of the triangles.

Embodiment 3

In embodiment 3, an operation of the address generator of embodiment 1 and embodiment 2 is explained in more detail. In embodiment 3, for convenience of explanation, a sample of dividing a polygon to a plurality of triangles as in embodiment 2 is explained. However, it is also possible to leave the polygon undivided as in embodiment 1.

An apparatus according to embodiment 3 is explained with reference to FIGS. 12–14.

Figure 12:
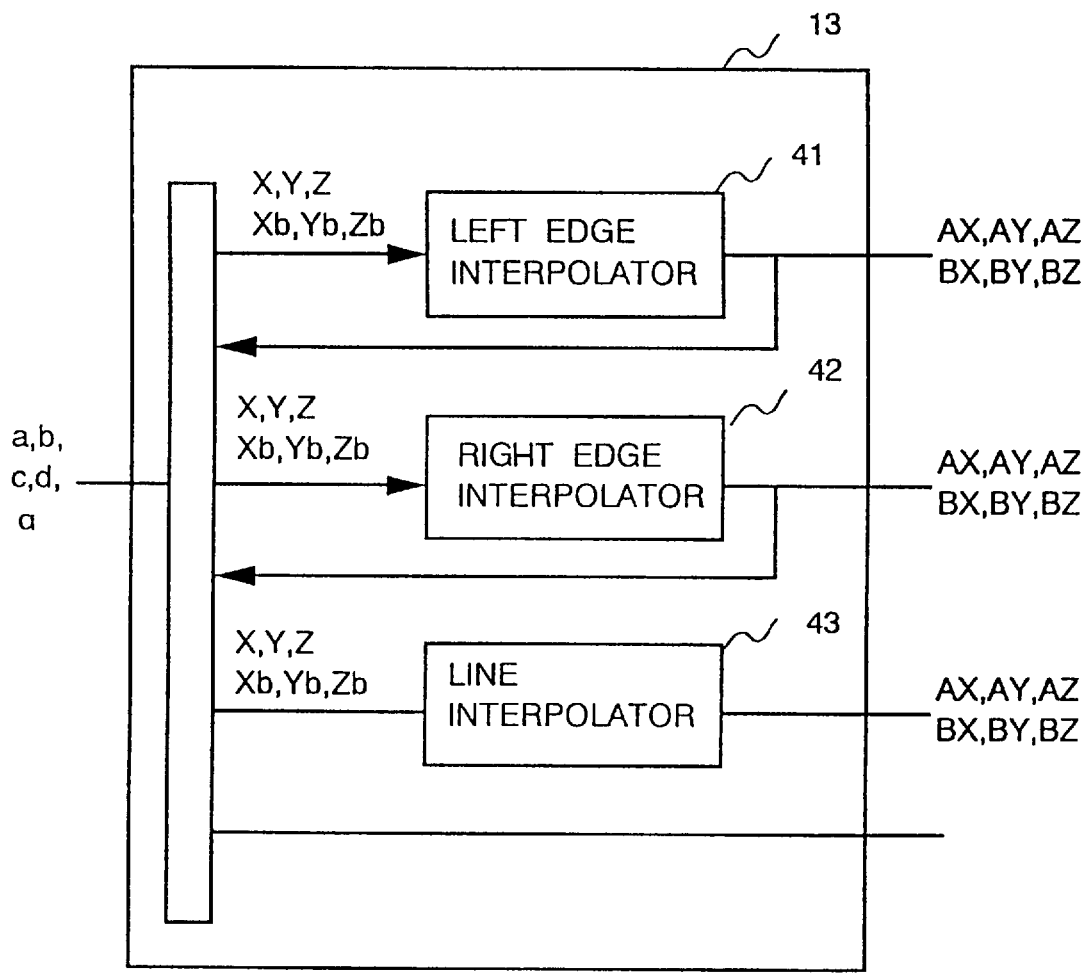
FIG. 12 is a configuration chart of the address generator of the volume rendering apparatus of embodiment 3.

FIG. 12 is a configuration chart of the address generator 13 which is illustrated in FIG. 1.

In FIG. 12, a left edge interpolator 41 interpolates each of left edges of each of triangles, which are divided from the mapping plane as in FIG. 10C, and each of triangles, which are divided from the volume plane as in FIG. 10B. The left edge interpolator 41 receives a, b, c and d in a plane equation from the parameter provider 12.

A right edge interpolator 42 interpolates each of right edges of each of triangles, which are divided from the mapping plane as in FIG. 10C, and each of triangles, which are divided from the volume plane as in FIG. 10B. The right edge interpolator 42 also receives a, b, c and d in a plane equation from the parameter provider 12.

A line interpolator 43 receives data AX, AY and AZ on each of edges of divided triangles of the mapping plane and data BX, BY and BZ on each of edges of divided triangles of the volume plane. The line interpolator 43 interpolates each of lines defined with two points, one point of the left edge and one point of the right edge.

Figure 13:
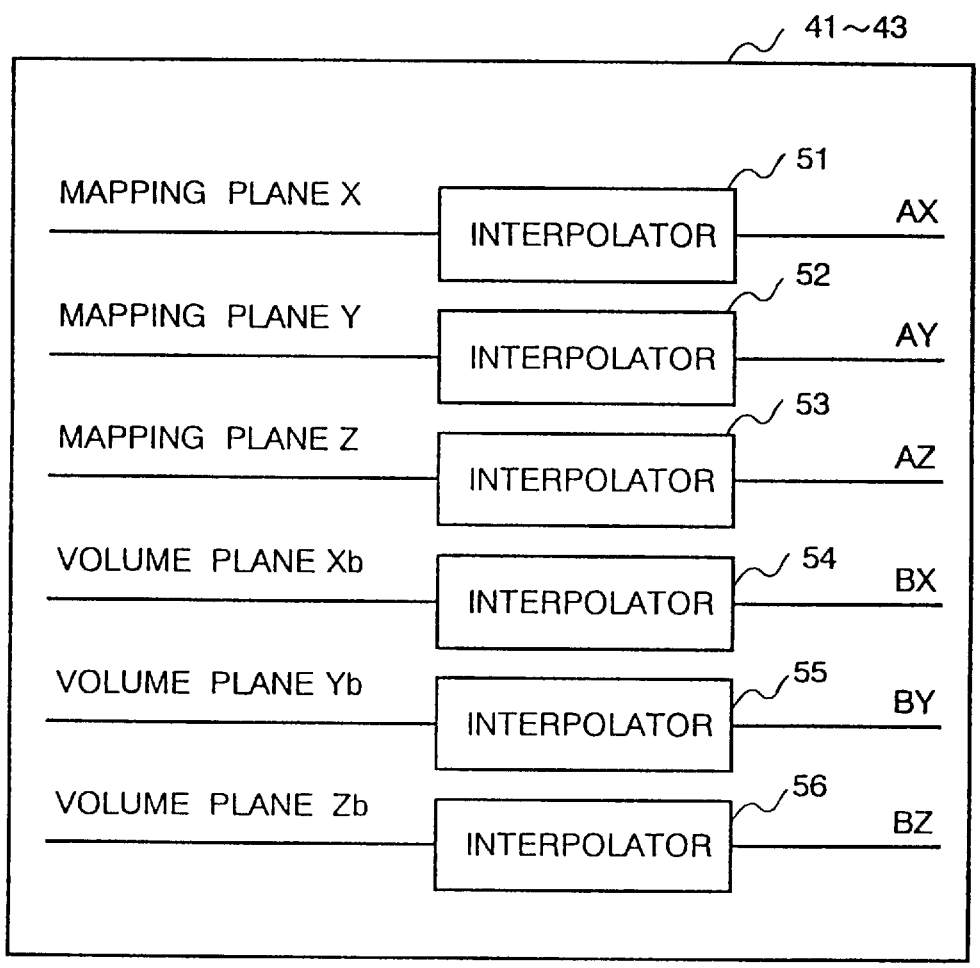
FIG. 13 illustrates edge interpolators in the address generator of FIG. 12.

FIG. 13 is a sample of the left edge interpolator 41, the right edge interpolator 42 and the line interpolator 43 which interpolates each of lines connecting the right edge and the left edge as illustrated in FIG. 12.

In FIG. 13, an interpolator 51 generates an x coordinate value of a triangle on the mapping plane in the image memory 14 by interpolation. An interpolator 52 generates a y coordinate value of the triangle on the mapping plane in the image memory 14 by interpolation. An interpolator 53 generates a z coordinate value of the triangle on the mapping plane in the image memory 14 by interpolation. An interpolator 54 generates an x coordinate value of a triangle on the volume plane in the voxel memory 11 by interpolation. An interpolator 55 generates a y coordinate value of the triangle on the volume plane in the voxel memory 11 by interpolation. An interpolator 56 generates a z coordinate value of the triangle on the volume plane in the voxel memory 11 by interpolation.

Figure 14:
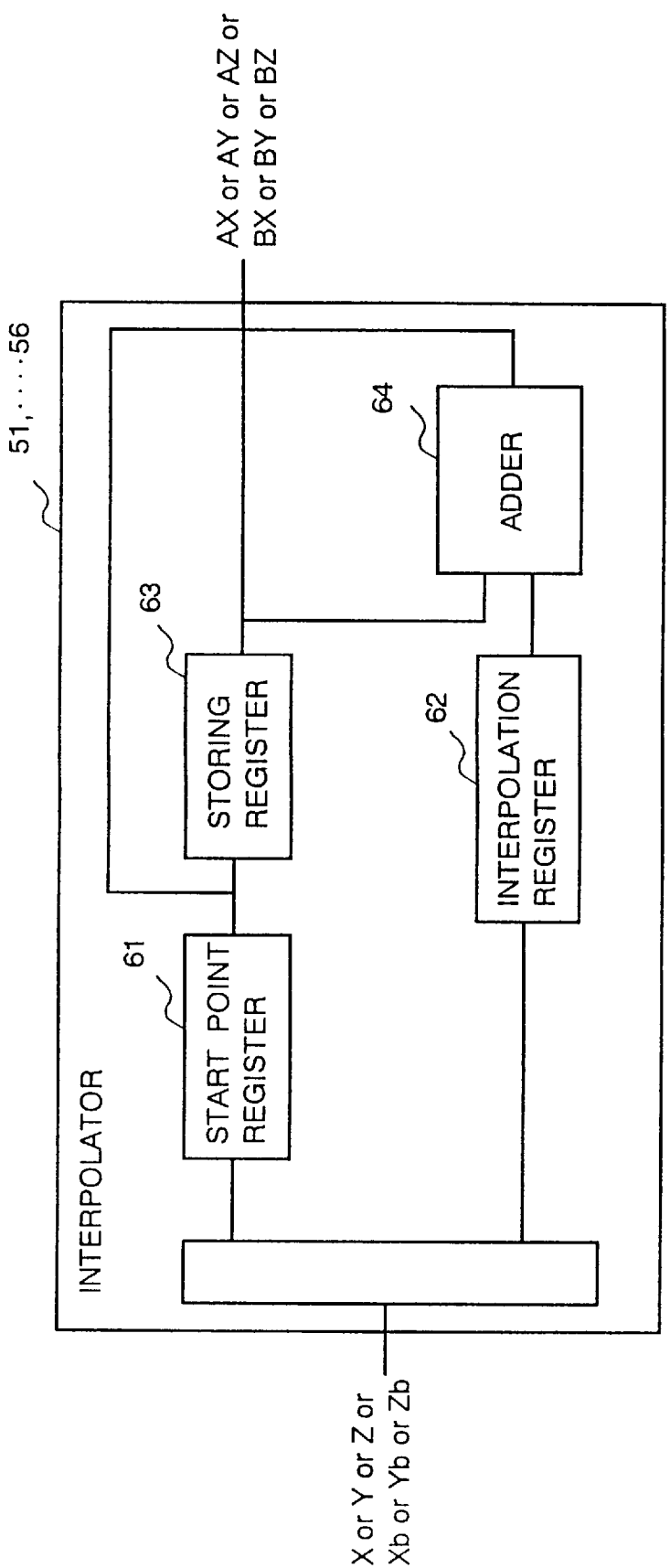
FIG. 14 shows a detailed configuration chart of the interpolators of FIG. 13.

FIG. 14 is a sample of the interpolators 51, 52, 53, 54, 55 and 56 which are illustrated in FIG. 13.

In FIG. 14, a start point register 61 stores a start point of a straight line which is interpolated. An interpolation register 62 stores interpolation data, a storing register 63 stores interpolated data or data in the start point register 61. An adder 64 accumulates data in the storing register 63 and data in the interpolation register 62.

Figure 15B:
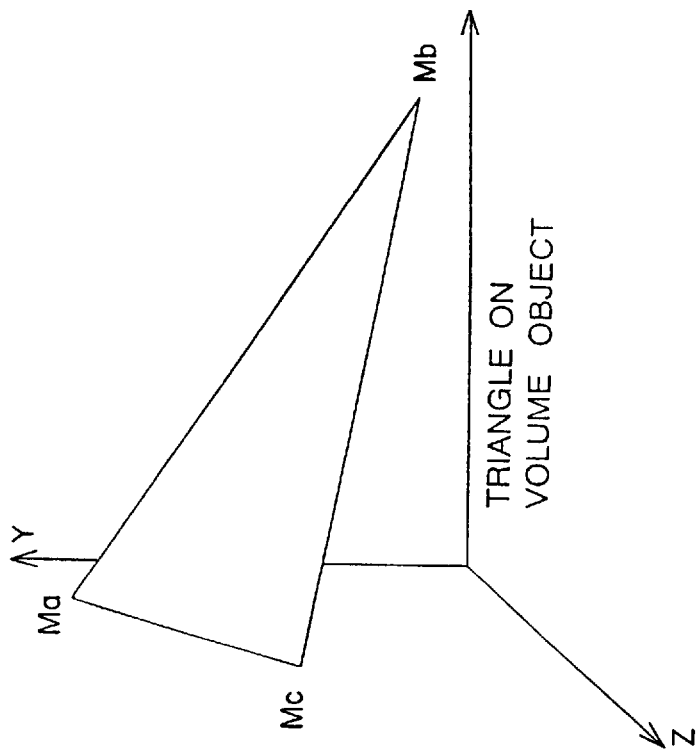
FIGS. 15A and 15B illustrate a corresponding relationship between division of edges of a triangle and production of pixels in an image memory.
Figure 15A:
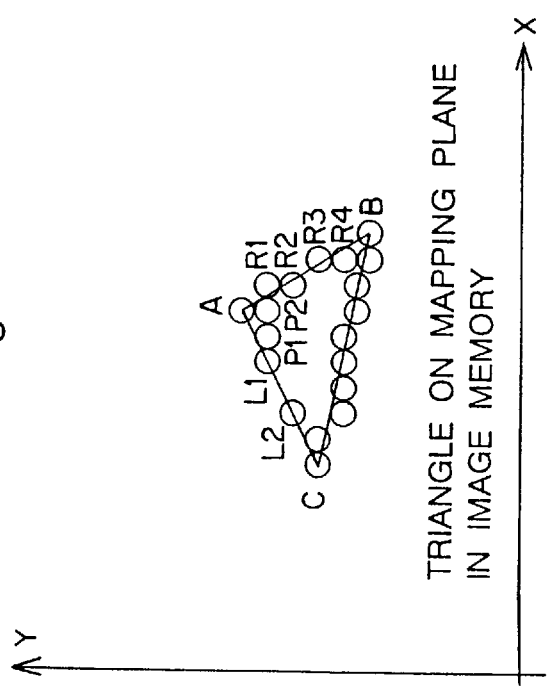

In FIGS. 15A and 15B, a corresponding relationship of each of data on the volume plane and each of data on the mapping plane in the image memory is explained.

Operations of each of interpolators are explained with reference to FIGS. 15A and 15B.

Edges of each of divided triangles on the mapping plane are divided into right edges and left edges. As illustrated in FIGS. 15A and 15B, this division of edges is performed so that a vertex with a maximum y coordinate value and a vertex with a minimum y coordinate value become endpoints of edges. In FIGS. 15A and 15B, a right edge is A–B, and a left edge is A–C–B. At the same time, edges of divided triangles on the volume plane in the image memory 14 are also divided to right edges and left edges. For the triangles of the volume plane, a right edge is Ma–Mb, and a left edge is Ma–Mc–Mb.

Then, the x, y and z coordinate values of the vertex A, which is a start point of each of the left edge and the right edge and Xb, Yb, Zb coordinate values of the vertex Ma corresponding to the vertex A of a triangle which is divided from the volume plane are inputted to each of the start point registers 61 of the interpolators 51, 52, 53, 54, 55 and 56, which constitute each of the left edge interpolation circuit 41 and the right edge interpolation circuit 42.

Whereas amounts of change of each of X, Y, Z, Xb Yb and Zb between two endpoints on each of the edges are ΔX, ΔY, $\Delta Z$, $\Delta Xb$ $\Delta Yb$ and $\Delta Zb$, and the interpolation values are dX, dY, dZ, dXb, dYb and dZb, the interpolation values are calculated by the address generator 13 as follows:

$$dX=\Delta X/\Delta Y, dY=1, dZ=\Delta Z/\Delta Y, dXb=\Delta Xb/\Delta Y, dYb=\Delta Yb/\Delta Y, dZb=\Delta Zb/\Delta Y.$$

Then, the interpolation values are stored to each of the interpolation registers 62 in each of the interpolators 51, 52, 53, 54, 55 and 56. When necessary data for interpolation is provided for each of the registers, data in each of the start point registers 61 in each of the interpolators is inputted to the storing register 63. The data in the storing register 63 and the data in the interpolation register 62 are added by the adder 64. The added data is stored in the storing register 63. The data in the storing register 63 and the data in the interpolation register 62 are repeatedly added, and R1, R2, R3, R4 and B for the right edge and L1, L2 and C for the left edge are created.

For this edge interpolation, the y coordinate value of the start point of the left edge and the y coordinate value of the start point of the right edge are same. Therefore, an interpolation value is defined as dY=1. When the left edge interpolation circuit 41 and the right edge interpolation circuit 42 operate synchronously, points on each of the left edge and the right edge, which are outputted from each of the left edge interpolator 41 and the right edge interpolator 42, are on a same scan line in the image memory 14. For example, in FIG. 15B, L1 and R1 are on a same scan line, and L2 and R2 are on a same scan line.

Coordinate values of AX, AY, AZ, BX, BY and BZ which are outputted from the left edge interpolator 41 are inputted to each of the start point registers 61 in each of the interpolators 51, 52, 53, 54, 55 and 56 in the line interpolator 43 as the X, Y and Z coordinate values and Xb, Yb and Zb coordinate values of the edge points on a same scan line.

The address generator 13 calculates interpolation values of two vertices in accordance with the two vertex data, and defines the calculated interpolation values in the interpolation register 62 in the line interpolator 43.

Whereas the amount of change of X, Y, Z, Xb, Yb and Zb of the straight lines connecting the point on the left edge, which is outputted from the left edge interpolator 41, and the point on the right edge, which is outputted from the right interpolator 42, are $\Delta X$, $\Delta Y$, $\Delta Z$, $\Delta Xb$, $\Delta Yb$ and $\Delta Ab$, and the interpolation values are dX, dY, dZ, dXb, dYb and dZb, the address generator 13 computes interpolation values as follows: $dX=1, dY=0, dZ=\Delta Z/\Delta X, dXb=\Delta Xb/\Delta X, dYb=\Delta Yb/\Delta X, dZb=\Delta Zb/\Delta X$.

The operations of the interpolators 51, 52, 53, 54, 55 and 56 in the line interpolator 43 are similar to the operations in each of the edge interpolators. When necessary data for interpolation is inputted to registers, data in the start point register 61 in the interpolator is inputted to the storing register 63, and the data in the storing register 63 and the data in the interpolation register 62 are added by the adder 64. The added data is inputted to the storing register 63 and stored. The data in the storing register 63 is updated repeatedly, and addresses on each point of lines are generated.

In this processing, the address generator generates voxel memory addresses which configure the volume plane and image memory addresses which configure the mapping plane, and achieves volume rendering.

In embodiment 3, a polygon on each of the mapping plane and the volume plane is divided to a plurality of triangles. Then, each of addresses on the mapping plane and the volume plane are obtained based on the divided triangles. However, it is also possible to obtain addresses without dividing both of the mapping plane and the volume plane to a plurality of triangles as in embodiment 1.

As stated in embodiment 3, the address generator of this invention is able to be substituted with an address generator of a texture mapping apparatus according to the related art.

Embodiment 4

Embodiment 4 deals with a case in which color data of an image is represented by integers and stored in the image memory.

An apparatus in embodiment 4 of this invention is explained in reference with FIG. 16.

FIG. 16 is a configuration chart of a volume rendering apparatus which includes an image memory 14b which includes a function of a frame memory.

Operations of the image memory 14b which is illustrated in FIG. 16 are same as the operations of the apparatus in embodiment 1.

As will be addressed later, the image memory stores color data as a floating point type data, and the frame memory stores a color data as an integer type data. Therefore, when a data is transferred from the image memory to the frame memory, the data in the image memory which is a floating point number is rounded to a decimal point. Hence, accuracy of the data is reduced once.

When blending is performed, the blender 15 stores color data in an integer type in the image memory 14b. Since the data is an integer, an additional frame memory in addition to the image memory 14b is not necessary. Hence, cost is saved.

However, since a calculated data is rounded in every time when the blender stores the data in the image memory 14b, the accuracy of the data is reduced by two times.

Embodiment 5

Embodiment 5 deals with a case in which a color data of an image which is a floating point type is stored in the image memory.

An apparatus in embodiment 5 of this invention is explained in reference with FIG. 17.

In FIG. 17, a frame memory 96, host CPU 97, display 98 and bus 99 are provided in addition to the volume rendering apparatus of FIG. 1.

The basic operation of the apparatus of embodiment 5 is similar to the operation of the apparatus of embodiment 1. The host CPU 97 registers a rendering volume data in a voxel memory like the micro processor in FIG. 1. The host CPU 97 also defines a point of view, and instructs the parameter provider 12 to start volume rendering. The image memory 14 stores RGB data of a floating point type. Since the image memory stores the data of a floating point type, even if a plurality of volume planes is layered, mapping of the volume data is able to be performed more accurately comparing to the image memory which stores a data of an integer type as described in embodiment 4.

The host CPU 97 layers a plurality of volume planes, converts data in the image memory 14 from a floating type to an integer type, transfers the converted data to the frame memory 96, and displays a volume-rendered image in the display 98.

When the blender 15 stores color data in the image memory 14, operations are performed as follows.

The operations depend on whether image data stored in the image memory is integer type data as in embodiment 4 or floating point type data as in embodiment 5.

In FIG. 7, when color data RGB1 which is stored at A5 is "7" and color data RGB2 which is stored at A6 is "3.35" and blending ratio α is 80%, a calculation is made as follows: 3.35×0.8+(1−0.8)×7=4.08. The calculated value of 4.08 is stored in the image memory 14.

When the image memory 14 stores an integer type data as in embodiment 4, the blender 15 stores "4" in the image memory 14. When the image memory 14 stores a floating type data as in embodiment 5, the blender 15 stores "4.08."

In the above calculation, RGB1 of "7" is used. However, when the image memory 14 accepts color data of a floating type, the RGB1 might be data of a floating type, e.g. "7.05," etc. When the image memory 14 stores color data of a floating type, volume data is mapped more accurately.

Embodiment 6

In embodiment 6, an operation of reading voxel data from the voxel memory is explained.

In each of the interpolators 54-56 in the apparatus of embodiment 1, x, y and z coordinate values of the volume plane, which is calculated based on a, b, c and d by an equation of the volume plane, may not be found in the voxel memory. In that case, data is read out from a voxel which is closest to the calculated address, and volume rendering is performed.

Figure 18:
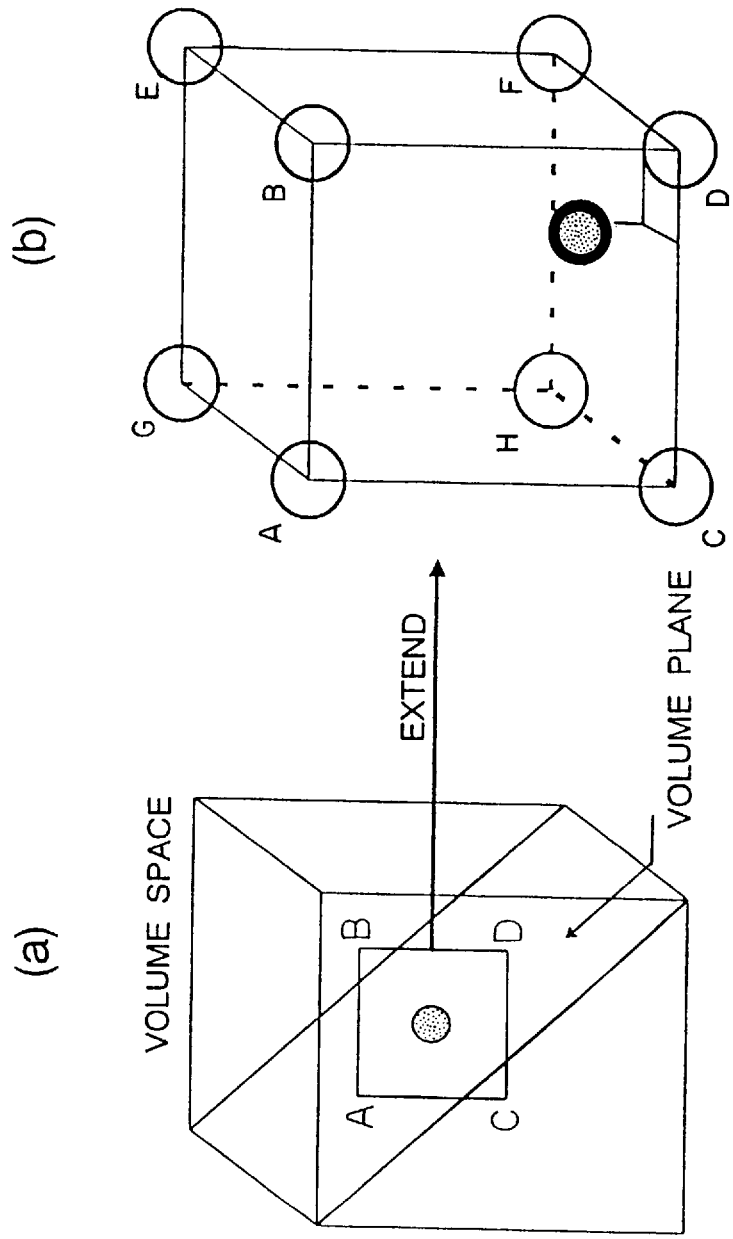
FIG. 18 illustrates a selection process among neighboring voxels in embodiment 6.
Figure 19:
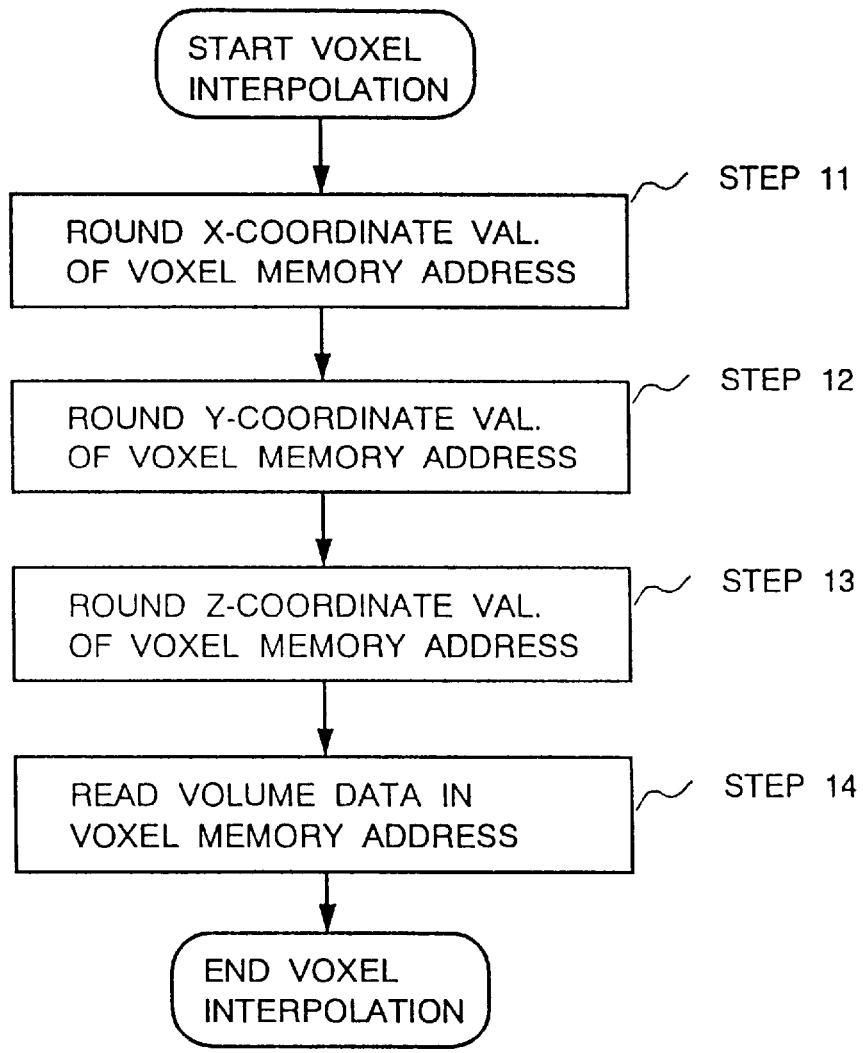
FIG. 19 shows a flow chart of the selection process in embodiment 6.

FIG. 18 illustrates a concept of this method. FIG. 19 illustrates a flow chart of this operation. When an address on a volume plane in a volume space as illustrated in (a) of FIG. 18 doesn't indicate a voxel as illustrated in (b) of FIG. 18 (an extended drawing around a calculated address), an address of a closest voxel is calculated. This calculation is made by rounding x, y and z coordinate values of the address in the voxel memory to a decimal point, and voxel D is obtained. The data of the voxel D is used, and data is able to be read out easily.

Embodiment 7

Embodiment 7 deals with an operation of reading out voxel data more accurately than the operation of each of the interpolators in embodiment 6.

In each of interpolators 54-56 in the apparatus of embodiment 1, bilinear interpolation is performed by using eight voxels around a predefined address to interpolate addresses. The interpolated addresses are used as voxel data, and volume rendering is performed.

Figure 20:
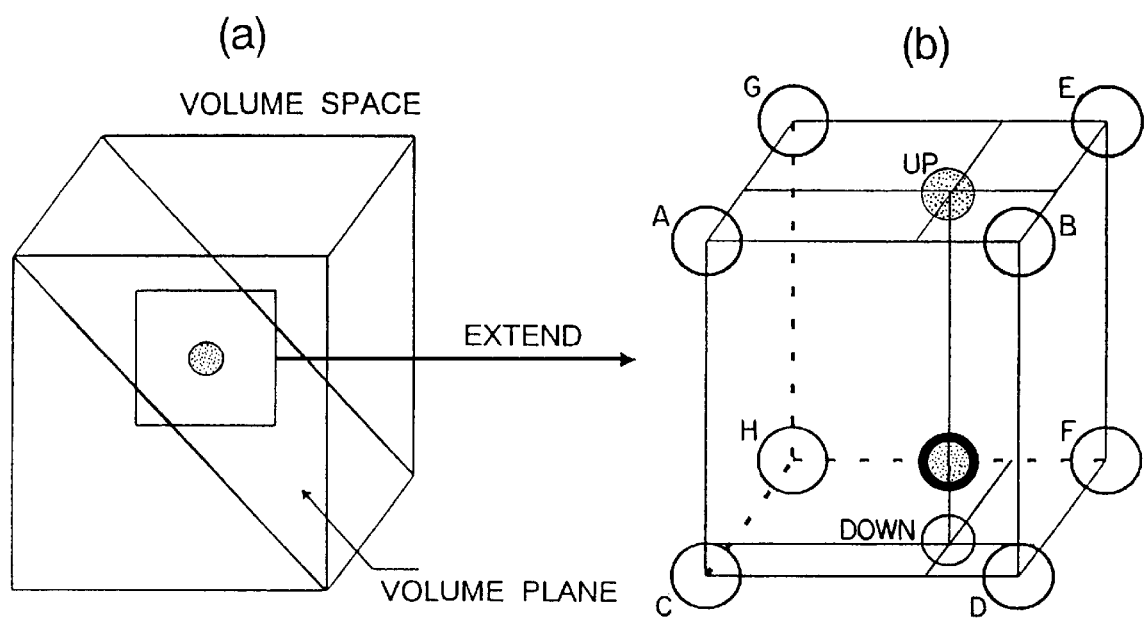
FIG. 20 illustrates a bilinear interpolation process of the volume rendering apparatus in embodiment 7.

FIG. 20 illustrates a concept of bilinear interpolation. When an address on a volume plane in a volume space as illustrated in (a) of FIG. 20 doesn't indicate a voxel as illustrated in (b) of FIG. 20 (an extended drawing of around a calculated address), a bilinear interpolation is performed by using surrounding voxels. In bilinear interpolation, data in UP is obtained by interpolating voxels ABEG. Data in DOWN is obtained by interpolating CDFH. When the data in UP and the data in DOWN are interpolated, data at the interpolated address is obtained. By interpolation, calculation volume increases, but high quality volume rendering is realized.

Figures 21A, 21B:
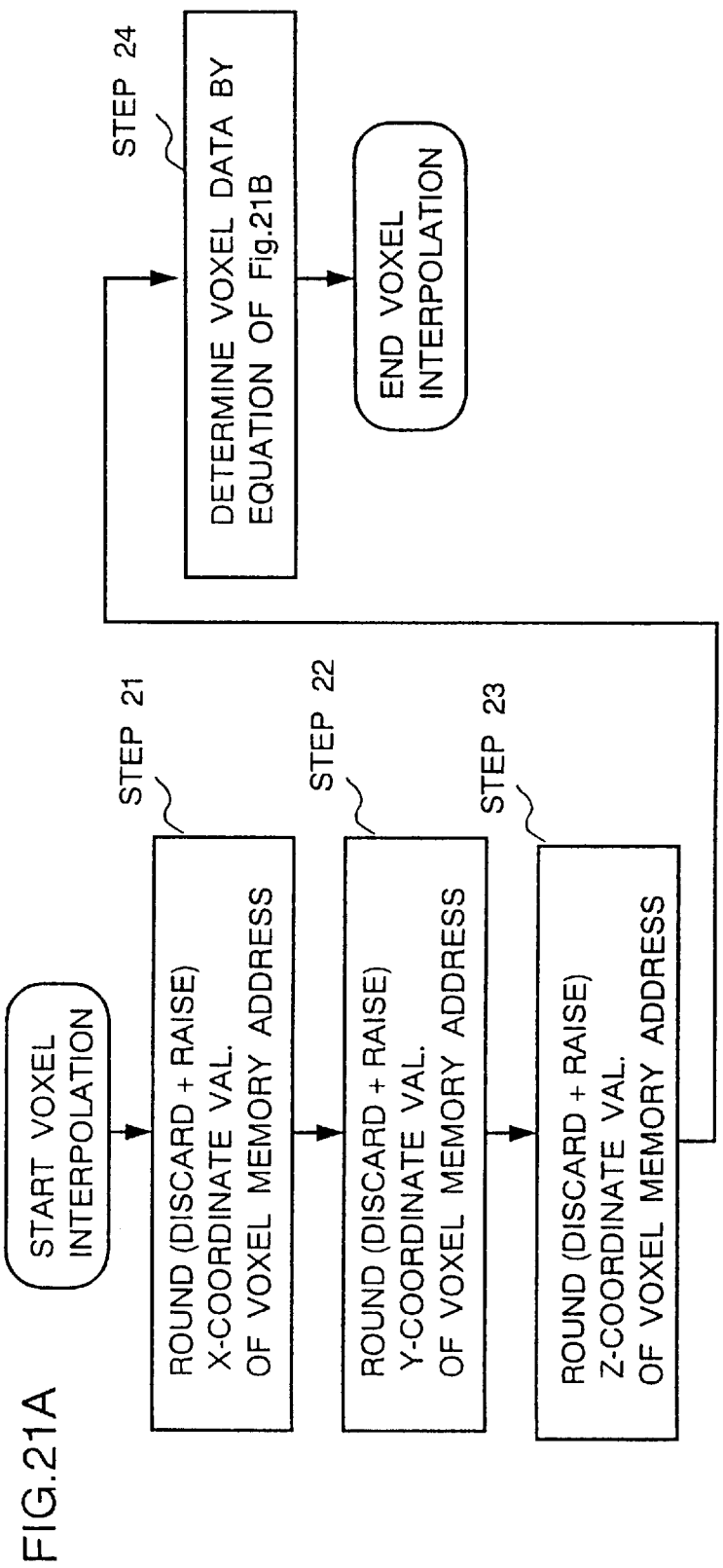
FIGS. 21A and 21B show a flow chart of the interpolation process of FIG. 20.
Figure 22:
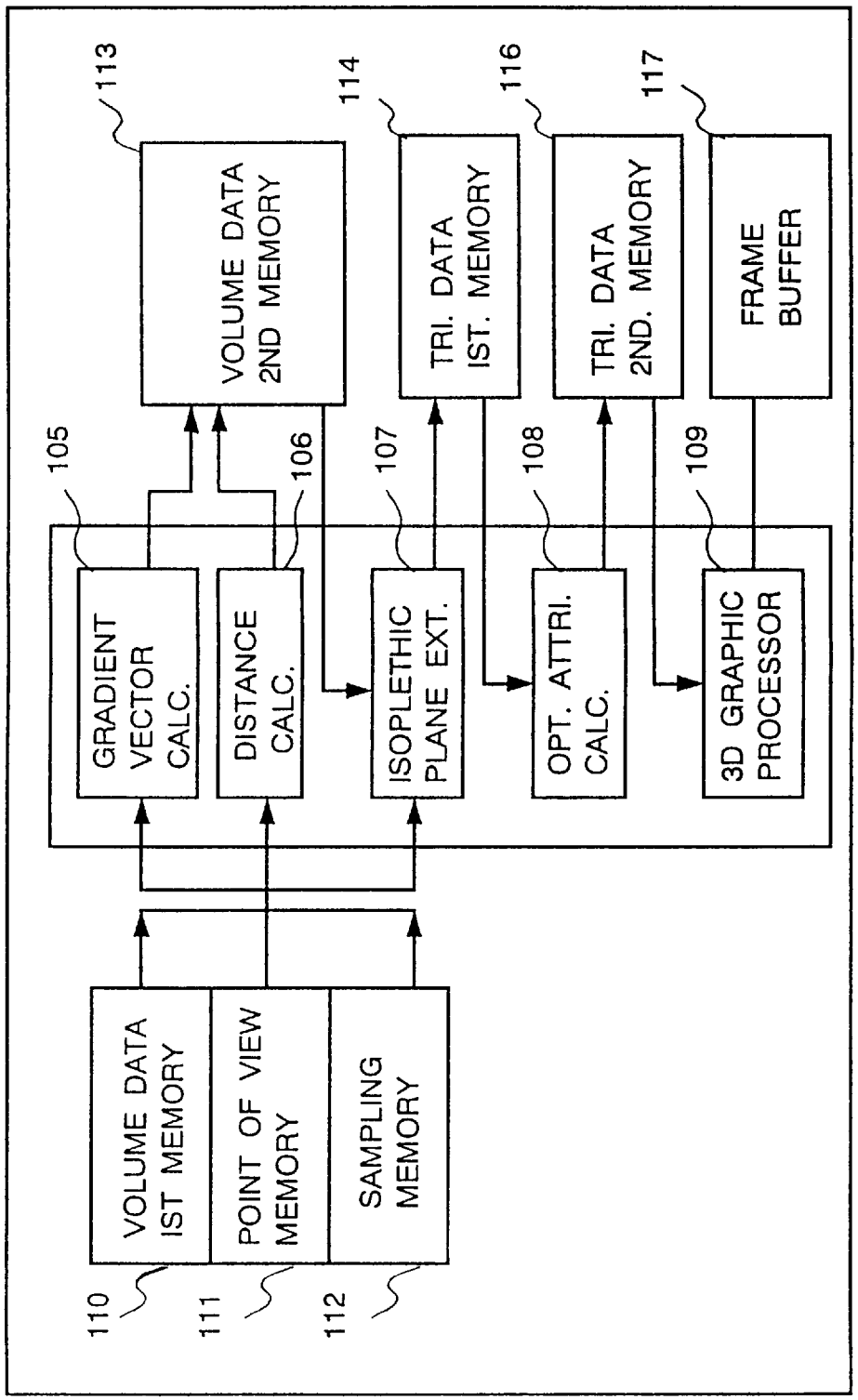
FIG. 22 shows a configuration chart of a volume rendering apparatus of shading method according to the related art.
Figure 23:
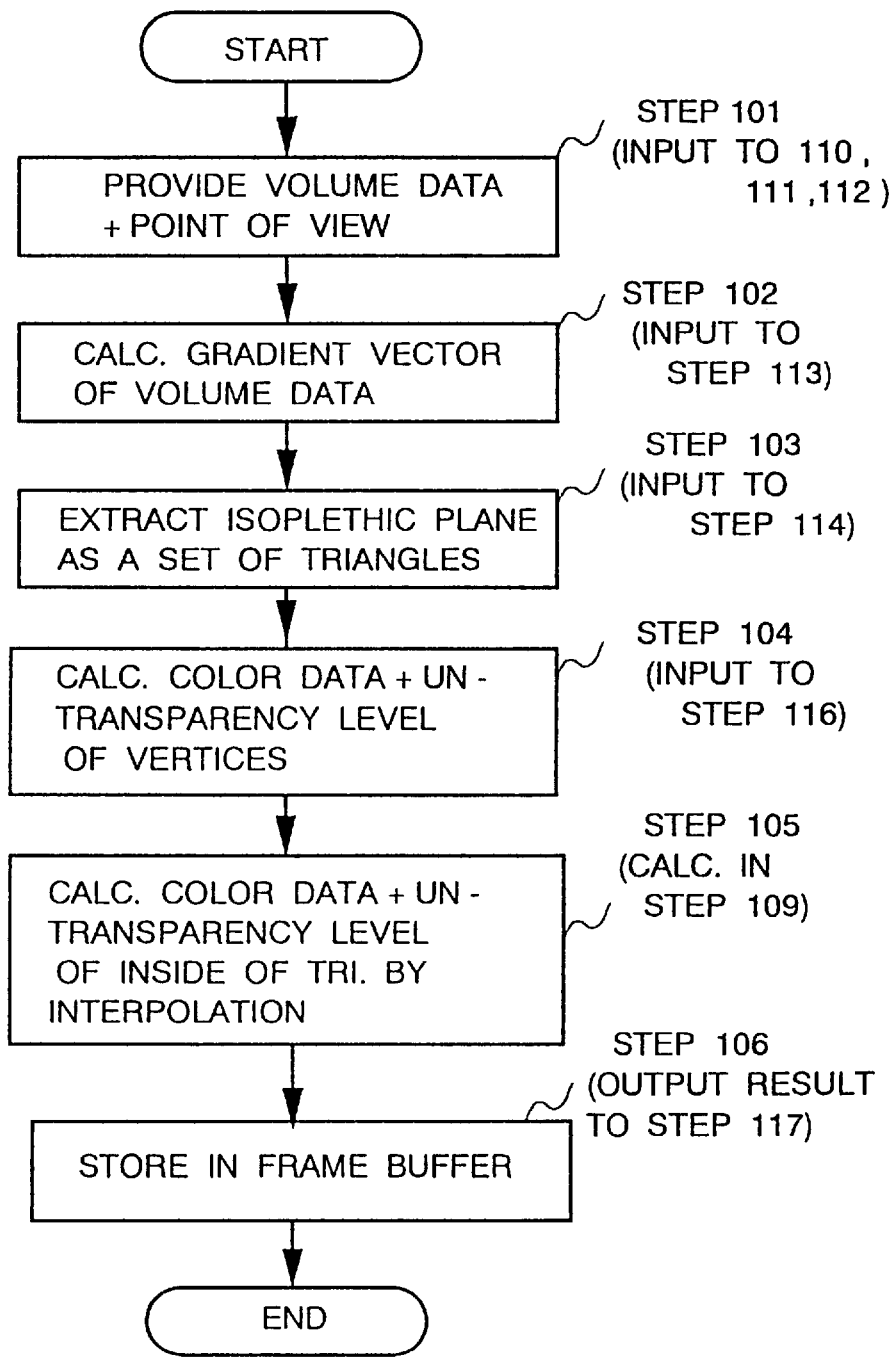
FIG. 23 shows a flow chart of the apparatus in FIG. 22 according to the related art.

A flow chart of this operation is illustrated in FIG. 21A. In FIG. 21B, each of logical algorithm of the logic of the interpolation equation in each of steps is shown.

In steps 21-23 which are shown in FIG. 21A, each of x, y and z of each of voxel memory addresses is rounded to discard to a decimal point, and XD, YD and ZD coordinate values in DOWN in FIG. 20 are obtained.

Further, in steps 21-23, each of x, y and z of each of the voxel memory addresses is rounded to be raised to a decimal point, and XU, YU and ZU coordinate values in UP in FIG. 20 is obtained.

Then, voxel data is obtained based on the obtained coordinate values by the interpolation equation of FIG. 21B. The voxel data is obtained by using the equation of FIG. 21B:

Voxel Data $=U1 \times (Z-ZD)+D1 \times (ZU-Z)$.

In this way, the voxel data is able to be obtained (step 24).

In FIG. 21B, each of UP1, UP2, DP1, DP2, U1 and D1 shows an equation to calculate a temporary value in a process to obtain the voxel data.

As stated, when coordinate values of a point on the volume plane is not in the voxel memory, interpolation is performed among voxel data in the voxel memory. Accordingly, a volume rendering apparatus which generate high quality volume data is able to be realized.

As stated, in embodiments 6 and 7, when mapping is performed, a voxel at an address which is closest to an obtained address is read out from the voxel memory, or a data is obtained by bilinear interpolation.

According to the volume rendering method in embodiments 1-7, volume rendering includes the following steps:

a step of providing a mapping object corresponding to a volume object which is indicated with volume data, a step of providing a volume plane on a plane which is orthogonal to a direction of view, a step of providing a mapping plane corresponding to the volume object, a step of performing texture mapping of data on the volume plane, which is texture data, and data on the mapping plane, and a step of writing data on the mapping plane back to a display memory by blending to render an image semi-transparently.

In embodiments 1-7, volume rendering is performed in these steps.

The volume rendering apparatus of this invention is configured as stated in embodiments 1-7, and includes the following effects.

A three-dimensional volume data is sliced to a plurality of two-dimensional images and the sliced images are processed by mapping and by blending. Therefore, a mapping apparatus according to the related art is able to be applied to the volume rendering apparatus of this invention. Further, volume rendering is able to be performed easily. A distance calculation for depth is also able to be made easily.

Furthermore, when volume data is read out, the volume data is able to be displayed accurately by directly displaying the volume data if the volume data exists and by interpolating the volume data when the volume data doesn't exist.

Having thus described several particular embodiments of the invention, various alterations, modifications, and improvements will readily occur to those skilled in the art. Such alterations, modifications, and improvements are intended to be within the spirit and scope of the invention. Accordingly, the foregoing description is by way of example only and is limited only as defined in the following claims and the equivalents thereto.

What is claimed is:

1. A volume rendering apparatus comprising:

a voxel memory for storing three-dimensional volume data;

a processor for providing three-dimensional volume data representing an object to the voxel memory as a volume object, and for providing a point of view coordinate space, a direction of view, and a mapping object on which the volume object is to be mapped in the point of view coordinate space;

a two-dimensional rendering unit, coupled to the processor, for generating at least one two-dimensional volume plane representing at least one slice of the volume object that is orthogonal to the direction of view, for generating at least one two-dimensional mapping plane representing at least one slice of the mapping object that is orthogonal to the direction of view, for mapping the three-dimensional volume data within the at least one two-dimensional volume plane on the at least one two-dimensional mapping plane, and for blending the mapped three-dimensional volume data to generate blended data; and an image memory for storing the blended data.

2. The volume rendering apparatus of claim 1, wherein the two-dimensional rendering unit comprises:

a parameter provider for calculating plane equations of the at least one two-dimensional volume plane and the at least one two-dimensional mapping plane;

an address generator, coupled to the parameter provider, for obtaining a first parameter from the plane equation of the at least one two-dimensional volume plane, for generating a plurality of voxel memory addresses which correspond to a plurality of coordinate points on the at least one two-dimensional volume plane based on the first parameter, for obtaining a second parameter from the plane equation of the at least one two-dimensional mapping plane, and for generating a plurality of image memory addresses which correspond to a plurality of coordinate points on the at least one two-dimensional mapping plane based on the second parameter;

a mapping unit, coupled to the address generator, for obtaining the three-dimensional volume data based on the plurality of voxel memory addresses from the voxel memory and mapping the obtained three-dimensional volume data on the at least one two-dimensional mapping plane which is indicated by the plurality of image memory addresses; and a blender, coupled to the mapping unit, for blending the mapped three-dimensional volume data on the two-dimensional mapping plane.

3. The volume rendering apparatus of claim 2, wherein the blender blends the mapped three-dimensional volume data and three-dimensional volume data which is indicated by the plurality of image memory addresses according to a predefined blending ratio, and stores the blended data on the two-dimensional mapping plane in the image memory.

4. The volume rendering apparatus of claim 2, wherein the address generator includes an address generator used in a two-dimensional texture mapping apparatus and the mapping unit includes a mapping unit used in the two-dimensional texture mapping apparatus.

5. The volume rendering apparatus of claim 2, wherein the parameter provider divides the at least one two-dimensional volume plane into a plurality of triangles, and divides the at least one two-dimensional mapping plane into a corresponding plurality of triangles; and wherein the address generator generates the plurality of voxel memory addresses for the plurality of triangles which constitute the at least one two-dimensional volume plane, and generates the plurality of image memory addresses in image memory for the corresponding plurality of triangles which constitute the at least one two-dimensional mapping plane.

6. The volume rendering apparatus of claim 2, wherein the address generator generates a portion of the plurality of voxel memory addresses and a portion of the plurality of image memory addresses by interpolation.

7. The volume rending apparatus of claim 6, wherein the address generator divides the at least one two-dimensional volume plane into a left edge and a right edge and generates voxel memory addresses that are located inside the left edge and the right edge by interpolating the left edge and the right edge; and wherein the address generator also divides the at least one two-dimensional mapping plane into a left edge and a right edge and generates image memory addresses that are located inside the left edge and the right edge by interpolating the left edge and the right edge.

8. The volume rendering apparatus of claim 2, wherein the image memory stores integer data, and the image memory operates as a frame memory for display.

9. The volume rendering apparatus of claim 2, wherein the image memory stores floating point data, and the volume rendering apparatus further comprises an independent frame memory for displaying data in the image memory.

10. The volume rendering apparatus of claim 2, wherein the mapping unit selects a closest voxel memory address to the plurality of voxel memory addresses generated by the address generator, and the mapping unit obtains the three-dimensional volume data from the voxel memory based on the closest voxel memory address.

11. The volume rendering apparatus of claim 2, wherein the mapping unit selects eight voxel memory addresses around a first voxel memory address of the plurality of voxel memory addresses generated by the address generator, and calculates the three-dimensional volume data of the first voxel memory address by bilinear interpolation of the three-dimensional volume data in the eight voxel memory addresses, and the mapping unit obtains the three-dimensional volume data from the voxel memory based on the first voxel memory address.

12. The volume rendering apparatus of claim 2, wherein the three-dimensional volume data representing the object includes coordinate data in a three-dimensional discrete space and color data corresponding to the coordinate data.

13. The volume rendering apparatus of claim 1, wherein the processor predefines an interval between slices of the volume object and between slices of the mapping object.

14. A volume rendering method comprising steps of:

receiving a volume object for three-dimensional volume data and a mapping object corresponding to the volume object;

receiving a direction of view for the volume object;

generating a plurality of volume planes orthogonal to the direction of view and a plurality of mapping planes corresponding to the volume object;

performing two-dimensional texture mapping for each of the plurality of mapping planes by using each of the plurality of volume planes as a texture plane; and blending three-dimensional volume data that is mapped on each of the plurality of mapping planes and storing blended data in an image memory.

15. The volume rendering method of claim 14, wherein the step of generating the plurality of volume and mapping planes comprises a step of determining slices of the volume object and the mapping object according to a predefined sampling interval.

16. The volume rendering method of claim 15, wherein the step of performing two-dimensional texture mapping comprises steps of:

generating addresses on a first of the plurality of volume planes and on a first of the plurality of mapping planes; and performing mapping based on the addresses on the first volume plane and the first mapping plane.

17. The volume rendering method of claim 16, wherein the step of performing two-dimensional texture mapping further comprises steps of:

dividing the first volume plane to a plurality of triangles and dividing the first mapping plane into corresponding plurality of triangles; and performing texture mapping for each of the plurality of triangles and the corresponding triangles.

18. The volume rendering method of claim 16, wherein the step of generating the addresses on the first volume plane and the addresses on the first mapping plane comprises a step of generating a portion of the addresses on the first volume plane and the first mapping plane by interpolation.

19. The volume rendering method of claim 16, wherein the step of performing mapping comprises a step of obtaining volume data which corresponds a first address of the generated addresses on the first volume plane by interpolation, when the volume data corresponding to the first generated address does not exist.

20. The volume rendering method of claim 14, wherein the step of blending comprises a step of adding three-dimensional volume data and the three-dimensional volume data mapped on a first of the plurality of mapping planes according to a predefined blending ratio.

21. The volume rendering method of claim 20, wherein the step of adding comprises a step of accumulating the three-dimensional volume data mapped on the first of the plurality of mapping planes into the blended data.

* * * * *